(12) United States Patent
Okada et al.

(10) Patent No.: US 7,015,292 B2
(45) Date of Patent: Mar. 21, 2006

(54) SILICON-CONTAINING OLEFIN COPOLYMER, CROSSLINKABLE RUBBER COMPOSITION THEREOF, AND USE THEREOF

(75) Inventors: Keiji Okada, Chiba (JP); Hidetatsu Murakami, Chiba (JP); Takashi Hakuta, Chiba (JP); Masaaki Kawasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/499,122

(22) PCT Filed: Dec. 26, 2002

(86) PCT No.: PCT/JP02/13660

§ 371 (c)(1),
(2), (4) Date: Jun. 17, 2004

(87) PCT Pub. No.: WO03/057747

PCT Pub. Date: Jul. 17, 2003

(65) Prior Publication Data

US 2005/0038214 A1   Feb. 17, 2005

(30) Foreign Application Priority Data

Dec. 28, 2001   (JP) .......................... 2001-400863

(51) Int. Cl.
*C08F 130/08*   (2006.01)
*C08F 10/00*   (2006.01)

(52) U.S. Cl. ...................... 526/281; 526/279; 526/348; 526/348.8

(58) Field of Classification Search ............... 526/279, 526/281, 348, 348.8
See application file for complete search history.

(56) References Cited

U.S. PATENT DOCUMENTS

| | | | | |
|---|---|---|---|---|
| 3,375,236 A | * | 3/1968 | Van De Castle et al. | ... 526/279 |
| 3,764,589 A | * | 10/1973 | Bond et al. | ...... 525/326.5 |
| 3,838,115 A | * | 9/1974 | Bond | ...... 526/279 |
| 6,265,506 B1 | * | 7/2001 | Goodall et al. | ...... 526/172 |
| 6,608,144 B1 | | 8/2003 | Nakamura et al. | |
| 2003/0096904 A1 | | 5/2003 | Hakuta et al. | |

FOREIGN PATENT DOCUMENTS

| | | | |
|---|---|---|---|
| EP | 1 088855 A1 | | 4/2001 |
| JP | 04-154855 | | 5/1992 |
| JP | 05-112684 | * | 5/1993 |
| JP | 07-033924 | | 2/1995 |
| JP | 1113027 A1 | | 7/2001 |
| JP | 2002-20435 A | | 1/2002 |
| JP | 2002-114826 A | | 4/2002 |
| JP | 2002-179875 A | | 6/2002 |
| JP | 2002-293843 A | | 10/2002 |

* cited by examiner

*Primary Examiner*—Helen L. Pezzuto
(74) *Attorney, Agent, or Firm*—Birch, Stewart, Kolasch & Birch, LLP

(57) ABSTRACT

A silicon-containing olefin copolymer is provided which comprises (a) a constituent unit derived from —$CH_2$—$CH_2$— such as ethylene, (b) a constituent unit derived from —$CH_2$—CHR— where R is a hydrocarbon group of 1 to 18 carbon atoms, and (c) a constituent unit containing a specific silicon-containing group. A silicon-containing olefin copolymer is also provided which is obtainable by co-polymerizing ethylene, an a-olefin of 3 to 20 carbon atoms and a specific silicon-containing ethylene monomer.

11 Claims, No Drawings

SILICON-CONTAINING OLEFIN COPOLYMER, CROSSLINKABLE RUBBER COMPOSITION THEREOF, AND USE THEREOF

FIELD OF THE INVENTION

The present invention relates to a silicon-containing olefin copolymer, a cross-linkable rubber composition of the copolymer and uses thereof. More specifically, it relates to a cross-linkable (vulcanizable) olefin copolymer containing constituent units derived from a silicon compound as a site for cross-linking, its cross-linkable rubber composition and its uses.

BACKGROUND OF THE INVENTION

Ethylene/α-olefin random copolymers such as EPDM and the like generally have excellent weathering resistance, heat resistance and ozone resistance, and used for electrical wire-covering materials such as electric power cables, cabtyre cords, electric wires for ships, electric insulating rubber tapes, rubber-mold stress cones, electric joint parts and the like, home electric insulating parts such as anode caps, wedges and the like, electric insulating parts for automobiles such as plug caps, grommets, ignition cables, lamp socket covers and the like, terminal covers and semiconductor rubber parts.

Conventional ethylene/α-olefin random copolymers have a defect such that it is inferior in resistance to compression set as compared with silicon rubber etc. To cope with this defect, a method of peroxide cross-linking is more effective than that of sulfur vulcanization. This method, however, has defects that when hot air cross-linking with HAV (hot air vulcanization vessel), UHF (ultra high frequency electromagnetic wave), etc is employed, the surface of a rubber is not cross-linked, or degradation is induced and thereby the scratch resistance of the rubber is extremely deteriorated. The defects are due to the reason that peroxide does not participate in cross-linking and the rubber surface contacts oxygen and thereby degradation proceeds. When the cross-linking is conducted by steam cross-linking with shutting oxygen off or by lead covering cross-linking, the scratch resistance of the rubber surface is improved but the production cost is disadvantageous.

JP-A-H04-154855 discloses a process for preparing a hot air cross-linkable rubber having excellent scratch resistance by using, in a HAV, a rubber composition which comprises a hot air cross-linkable ethylene/propylene/diene copolymer rubber, organohydrodiene polysiloxane having at least two hydrogen atoms bonded with a silicon atom in a molecule, and a platinum catalyst.

However, on testing the invention disclosed in this publication, the present inventors found that the scratch resistance and the resistance to compression set were not sufficiently satisfactory for them.

JP-A-H07-33924 discloses a process for preparing a hot air cross-linkable rubber having excellent scratch resistance by peroxide cross-linking a rubber composition, which is obtainable by adding polysiloxane having at least one reactive group to an ethylene/propylene/diene copolymer rubber.

However, on testing the invention disclosed in this publication, the present inventors found that the cross-linking efficiency is enhanced due to adding of peroxide to the rubber composition, but the scratch resistance of the surface of a rubber molded article after cross-linking is not suitable for practical use because peroxide radicals cause addition reaction of siloxane and also generation of polymer radicals.

Further, JP-A-2001-31808 discloses a polyene-containing copolymer capable of being modified with SiH group. In the polyene containing a vinyl group capable of being modified with SiH group, most of the vinyl groups are used for forming a long chain branch and a part of vinyl groups is only used for the reaction with SiH group so that the efficiency is low. Additionally, the generation of long chain branches causes a lowering of the rubber strength.

Accordingly, the advent of an olefin copolymer having a high cross-linking rate, excellent productivity and capable of preparing molded articles having excellent resistance to compression set, electric properties, strength and other properties, a preparation process thereof and a cross-linkable rubber composition of the copolymer has been desired.

The present invention is intended to solve the problems associated with the prior art as mentioned above, and it is an object of the present invention to provide an olefin copolymer having a high cross-linking rate, excellent productivity and capable of preparing molded articles having excellent resistance to compression set, electric properties, strength and other properties. It is another object of the present invention to provide a cross-linkable rubber composition of the copolymer. It is a further object of the present invention to provide uses thereof including sealing materials, potting materials, coating materials, adhesives and the like.

DISCLOSURE OF THE INVENTION

The first silicon-containing olefin copolymer of the present invention comprises:

(a) a constituent unit derived from —CH$_2$—CH$_2$—, (b) a constituent unit derived from —CH$_2$—CHR— [R is a hydrocarbon group of 1 to 18 carbon atoms], and (c) a constituent unit represented by the following formula (I)

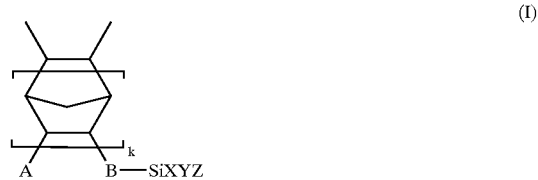

wherein k is 0, 1 or 2,

A is a hydrogen atom or a hydrocarbon group of 1 to 6 carbon atoms,

B is a single bond or a hydrocarbon group of 1 to 20 carbon atoms,

X, Y, and Z are each independently selected from a hydrocarbon group of 1 to 6 carbon atoms, hydride, halogen, alkoxy group of 1 to 6 carbon atoms, acyloxy group, ketoximate group, amide group, acid amide group, aminoxy group, thioalkoxy group and amino group, at least one of X, Y and Z is selected from a halogen, an alkoxy group of 1 to 6 carbon atoms, acyloxy group, ketoximate group, amide group, acid amide group, aminoxy group, thioalkoxy group and amino group, and the first silicon-containing olefin copolymer has:

(i) a molar ratio [(a)/(b)] of the constituent unit (a) to the constituent unit (b) of from 99/1 to 30/70, (ii) a content of the constituent unit (c) of from 0.1 to 10 mol % based on 100 mol % of the total amounts of the constituent units (a), (b) and (c), and (iii) a branching index of not less than 0.70.

In the silicon-containing olefin copolymer, the constituent unit (c) is preferably represented by the formula (I) in which k is 0, A is a hydrogen atom and B is represented by —$(CR^1R^2)_n$—, namely represented by the following formula (II)

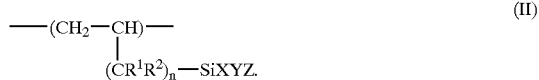
(II)

In the formula, n is an integer of 0 to 10, $R^1$ and $R^2$ each are independently a hydrogen atom or an alkyl group of 1 to 3 carbon atoms, and when n is 2 or more, the plural groups $R^1$ may be identical or different each other and also the plural groups $R^2$ may be identical or different each other.

Furthermore, in the first silicon-containing olefin copolymer of the present invention, the constituent unit (c) is preferably represented by the formula (I) in which k is 1, A is a hydrogen atom and B is represented by —$(CR^1R^2)_n$—, namely represented by the following formula (III)

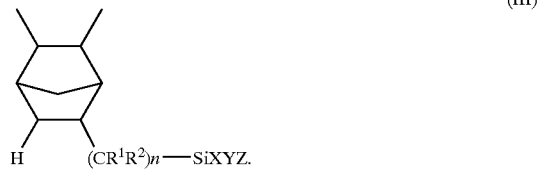
(III)

In the formula, n is an integer of 0 to 10, $R^1$ and $R^2$ each are independently a hydrogen atom or an alkyl group of 1 to 3 carbon atoms, and when n is 2 or more, the plural groups $R^1$ may be identical or different each other and also the plural groups $R^2$ may be identical or different each other.

The second silicon-containing olefin copolymer of the present invention is obtainable by copolymerizing ethylene, an α-olefin of 3 to 20 carbon atoms and an ethylene monomer having a silicon-containing group represented by the following formula (IV):

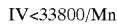
(IV)

wherein X, Y, and Z are each independently selected from a hydrocarbon group of 1 to 6 carbon atoms, hydride, halogen, alkoxy group of 1 to 6 carbon atoms, acyloxy group, ketoximate group, amide group, acid amide group, aminoxy group, thioalkoxy group and amino group, at least one of X, Y and Z is selected from a halogen, an alkoxy group of 1 to 6 carbon atoms, acyloxy group, ketoximate group, amide group, acid amide group, aminoxy group, thioalkoxy group and amino group, and the second silicon-containing olefin copolymer has:

(i) a molar ratio [ethylene/α-olefin] of ethylene to α-olefin of 3 to 20 carbon atoms of from 99/1 to 30/70, (ii) a content of the ethylene monomer having a silicon-containing group of from 0.1 to 10 mol % based on 100 mol % of the total amounts of ethylene, α-olefin and the ethylene monomer having a silicon-containing group of the formula (IV), and (iii) a branching index of not less than 0.70.

The first and second silicon-containing olefin copolymers according to the present invention preferably have an intrinsic viscosity [η], as measured in decalin at 135° C., of from 0.1 to 10 dl/g.

The first and second silicon-containing olefin copolymers according to the present invention preferably satisfy the following formula:

IV<33800/Mn wherein Mn is a number average molecular weight and IV is an iodine value.

In the present invention, the first and second silicon-containing olefin copolymers may be occasionally overlapped or not.

The cross-linkable rubber composition of the present invention comprises any one of the silicon-containing olefin copolymers as described in the above.

The cross-linkable rubber composition of the present invention is preferably used for electric and electronic parts, transporting machines, civil engineering and constructions, medical treatment or leisure activity use.

The cross-linkable rubber composition of the present invention is preferably used for sealing materials, potting materials, coating materials and adhesives.

The sealing materials, potting materials, coating materials and adhesives according to the present invention comprise the above cross-linkable rubber composition.

The cross-linked product of the present invention is obtainable by cross-linking the above cross-linkable rubber composition.

PREFERRED EMBODIMENTS OF THE INVENTION

The silicon-containing olefin copolymer, its cross-linkable rubber composition and the uses thereof according to the present invention will be described in detail hereinafter.

First, the silicon-containing olefin copolymer and the preparation process thereof are described.

Silicon-Containing Olefin Copolymer

The first silicon-containing olefin copolymer of the present invention comprises:

(a) a constituent unit derived from —$CH_2$—$CH_2$—, (b) a constituent unit derived from —$CH_2$—CHR— [R is a hydrocarbon group of 1 to 18 carbon atoms], and (c) a constituent unit represented by the formula (I) as described later, and has:

(i) a molar ratio [(a)/(b)] of the constituent unit (a) to the constituent unit (b) of from 99/1 to 30/70, (ii) a content of the constituent unit (c) of from 0.1 to 10 mol % based on 100 mol % of the total amounts of the constituent units (a), (b) and (c), and (iii) a branching index of not less than 0.70.

One of the constituent units of the first silicon-containing olefin copolymer of the present invention is a constituent unit (a) represented by —$CH_2$—$CH_2$—.

Another constituent unit of the first silicon-containing olefin copolymer of the present invention is a constituent unit (b) represented by —$CH_2$—CHR—.

In the formula, R is a hydrocarbon group of 1 to 18 carbon atoms. Examples the hydrocarbon group may include alkyl groups such as methyl, ethyl, isopropyl, n-butyl, n-pentyl, n-hexyl, n-heptyl and n-octyl. Among them, R is preferably a hydrocarbon groups of 1 to 8 carbon atoms, and particularly preferably methyl, ethyl, n-butyl or n-hexyl. These groups R may be present singly or in combination with two or more.

A further constituent unit of the first silicon-containing olefin copolymer of the present invention is a constituent unit (c) represented by the following formula

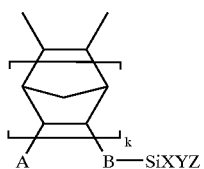

In the formula (I), k is 0, 1 or 2,

A is a hydrogen atom or a hydrocarbon group of 1 to 6 carbon atoms,

B is a single bond or a hydrocarbon group of 1 to 20 carbon atoms,

X, Y, and Z are each independently selected from a hydrocarbon group of 1 to 6 carbon atoms, hydride, halogen, alkoxy group of 1 to 6 carbon atoms, acyloxy group, ketoximate group, amide group, acid amide group, aminoxy group, thioalkoxy group and amino group. At least one of X, Y and Z is a group or atom selected from a halogen, alkoxy group of 1 to 6 carbon atoms, acyloxy group, ketoximate group, amide group, acid amide group, aminoxy group, thioalkoxy group and amino group.

A of the formula (I) showing the constituent unit (c) is a hydrogen atom or a hydrocarbon group of 1 to 6 carbon atoms. Examples of the hydrocarbon group of 1 to 6 carbon atoms may include aliphatic hydrocarbon groups such as methyl, ethyl, propyl, butyl etc; aromatic hydrocarbon groups such as phenyl, etc; alicyclic hydrocarbon groups such as cyclohexyl group, etc. Particularly, A is preferably a hydrogen atom.

B of the formula (I) is a hydrocarbon group of 1 to 20 carbon atoms. Examples of the hydrocarbon group of 1 to 20 carbon atoms, which is not particularly limited as far as it is a divalent hydrocarbon group, may include aliphatic hydrocarbon groups formed from an alkylene group such as —$CH_2$—, —$CH_2$—$CH_2$—, etc, aromatic hydrocarbon groups such as phenylene, etc; and alicyclic hydrocarbon groups such as cyclohexylene.

X, Y and Z each are independently a group or atom selected from a hydrocarbon group of 1 to 6 carbon atoms, hydride, halogen, alkoxy group of 1 to 6 carbon atoms, acyloxy group, ketoximate group, amide group, acid amide group, aminoxy group, thioalkoxy group and amino group.

Preferable examples of the hydrocarbon group of 1 to 6 carbon atoms are alkyl groups such as methyl, ethyl, n-propyl, isopropyl, n-butyl, isobutyl, tert-butyl, sec-butyl, pentyl and hexyl. Of these, alkyl groups of 1 to 3 carbon atoms are preferably used from the viewpoint of separation of residual monomers from a copolymer and cross-linking efficiency.

Examples of the alkoxy group of 1 to 6 carbon atoms are methoxy, ethoxy, n-propoxy, isopropoxy, n-butoxy, isobutoxy, tert-butoxy, sec-butoxy, pentyloxy and hexyloxy. Of these, alkoxy groups of 1 to 3 carbon atoms are preferably used from the viewpoint of separation of residual monomers from a copolymer and cross-linking efficiency.

Examples of the halogen are chlorine, fluorine, bromine and iodine atoms.

Examples of the acyloxy group are acetoxy and benzoyloxy groups.

Examples of the ketoximate group are acetoxymate, dimethyl ketoximate, diethyl ketoximate and cyclohexylmate groups.

Examples of the amide group are dimethylamide, diethylamide, dipropylamide, dibutylamide and diphenylamide groups.

Examples of the acid amide group are carboxylic acid amide, maleic acid amide, acrylic acid amide and itaconic acid amide groups.

Examples of the thioalkoxy group are thiomethoxy, thioethoxy, thiopropoxy, thioisopropoxy, thioisobutoxy, sec-thiobutoxy, tert-thiobutoxy, thiopentyloxy, thiohexyloxy and thiophenoxy groups.

Examples of the amino group are dimethylamino, diethylamino, dipropylamino, dibutylamino and diphenylamino groups.

Of these, alkoxyl groups, particularly, alkoxyl groups of 1 to 4 carbon atoms are preferred.

In the formula (I) showing the constituent unit (c), at least one of X, Y and Z is a group or atom selected from a halogen, alkoxy group of 1 to 6 carbon atoms, acyloxy, ketoximate, amide acid amide, aminoxy, thialkoxy and amino groups.

X, Y and Z, further, each are preferably a group or atom selected from a hydrogen atom, a hydrocarbon group of 1 to 6 carbon atoms, alkoxy group of 1 to 6 carbon atoms and halogen.

In the most preferable case, X, Y and Z, further, each are preferably a group or atom selected from a hydrogen atom, a hydrocarbon group of 1 to 6 carbon atoms, alkoxy group of 1 to 6 carbon atoms and halogen, and at least one of X, Y and Z is an alkoxy group or a halogen atom.

Further, among the above groups and atoms, X, Y and Z each are preferably a group or atom other than a hydrogen atom.

Examples of the silyl group represented by the formula —SiXYZ may include trimethoxy silyl, methyl dimethoxy silyl, dimethyl methoxy silyl, dimethoxy dichlorosilyl and triethoxy silyl. The silyl group represented by —SiXYZ is preferably a hydrolyzable group.

In the formula (I), k is 0, 1 or 2. In the case of k=0, the constituent unit (c) is —CHA-CH(BSiXYZ)—. In the case of k=1, the constituent unit (c) is

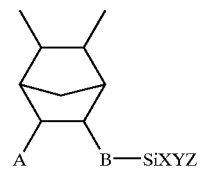

In the silicon-containing olefin copolymer, the constituent unit (c) is preferably represented by the formula (I) in which k is 0, A is a hydrogen atom and B is —$(CR^1R^2)_n$—, i.e. has a structure represented the following formula (II):

$$—(CH_2—CH)— \atop (CR^1R^2)_n—SiXYZ. \qquad (II)$$

In the formula (II), n is an integer of 0 to 10, $R^1$ and $R^2$ each are independently a hydrogen atom, an alkyl group of 1 to 3 carbon atoms. When n is two or more, the plural groups $R^1$ may be the same or different each other and the plural groups $R^2$ may be also the same or different each other.

$R^1$ and $R^2$ each are independently a hydrogen atom or an alkyl group of 1 to 3 carbon atoms.

Examples of the alkyl group of 1 to 3 carbon atoms may include methyl, ethyl, n-propyl and isopropyl groups.

Although n is an integer of 0 to 10, when n is two or more, the plural groups $R^1$ may be the same or different each other and the plural groups $R^2$ may be also the same or different each other. For example, when n is 2, it can have a structure of —CH(CH$_3$)—C(C$_2$H$_5$)(C$_3$H$_7$)—.

Furthermore, the constituent unit (c) is preferably represented by the formula (I) in which k is 1, A is a hydrogen atom and B is —(CR$^1$R$^2$)$_n$—, i.e. has a structure represented by the following formula (III):

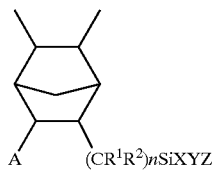

(III)

In the formula (III), n is an integer of 0 to 10, $R^1$ and $R^2$ each are independently a hydrogen atom, an alkyl group of 1 to 3 carbon atoms. When n is two or more, the plural groups $R^1$ may be the same or different each other and the plural groups $R^2$ may be also the same or different each other.

Examples of the alkyl group of 1 to 3 carbon atoms may include methyl, ethyl, n-propyl and isopropyl.

Although n is an integer of 0 to 10, when n is two or more, the plural groups $R^1$ may be the same or different each other and the plural groups $R^2$ may be also the same or different each other. For example, when n is 2, it can have a structure of —CH(CH$_3$)—C(C$_2$H$_5$)(C$_3$H$_7$)—.

Examples of the constituent unit (c) of the formula (II) are listed below:
—CH$_2$—CH(CH$_2$—Si(OMe)$_3$)—
—CH$_2$—CH(CH$_2$—SiMe(OMe)$_2$)—
—CH$_2$—CH(CH$_2$—SiMe$_2$(OMe))—
—CH$_2$—CH(CH$_2$—SiCl(OMe)$_2$)—
—CH$_2$—CH(CH$_2$—SiCl(OEt)$_2$)—
—CH$_2$—CH(CH$_2$—CH$_2$—Si(OMe)$_3$)—
—CH$_2$—CH(CH$_2$—CH$_2$—SiMe(OMe)$_2$)—
—CH$_2$—CH(CH$_2$—CH$_2$—SiMe$_2$(OMe))—
—CH$_2$—CH(CH$_2$—CH$_2$—SiCl(OMe)$_2$)—
—CH$_2$—CH(CH$_2$—CH$_2$—SiCl(OEt)$_2$)—
—CH$_2$—CH(CH$_2$—CH$_2$—CH$_2$—Si(OMe)$_3$)—
—CH$_2$—CH(CH$_2$—CH$_2$—CH$_2$—SiMe(OMe)$_2$)—
—CH$_2$—CH(CH$_2$—CH$_2$—CH$_2$—SiMe$_2$(OMe))—
—CH$_2$—CH(CH$_2$—CH$_2$—CH$_2$—SiCl(OMe)$_2$)—
—CH$_2$—CH(CH$_2$—CH$_2$—CH$_2$—SiCl(OEt)$_2$)—

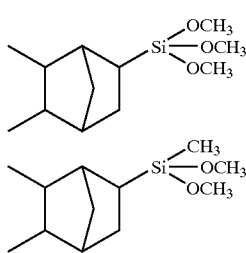

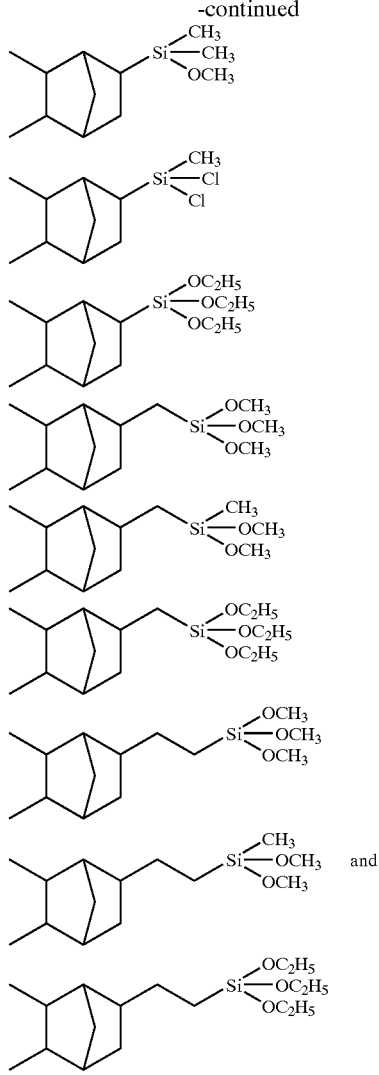

In the above formulas, Me is a methyl group and Et is an ethyl group.

In addition to the above constituent units, constituent units derived from a silicon-containing ethylene monomer obtainable by allowing a cyclopentadiene or dicyclopentadiene to react with a silicon-containing olefin compound represented by the formula (VII) as described later can be exemplified.

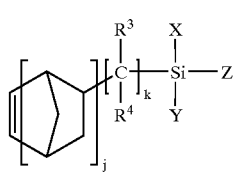

(VII)

The first silicon-containing olefin copolymer of the present invention may contain constituent units other than the above constituent units within the limit of not deteriorating the object of the invention.

Examples of the constituent units are:

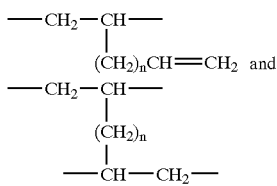

in the formulas, n is an integer of 1 to 10.

Further, the first silicon-containing olefin copolymer of the present invention may contain small amounts of the constituents having the following structures:

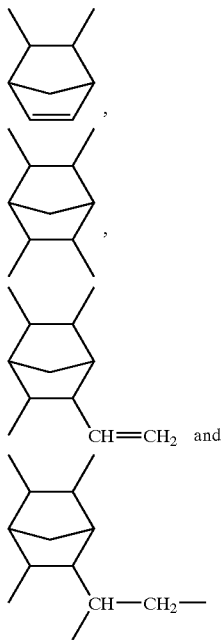

(Herein, in the indication "C—", the adjacent substituent of C— is abbreviated and it shows some group such as a hydrocarbon group or polymer chain and the like.)

For example, the first silicon-containing olefin copolymer of the present invention having a branching index of not less than 0.70 may contain small amounts of the constituent units having the above structures. The preferable range of the branching index is as previously described.

The first silicon-containing olefin copolymer of the present invention can be produced by, for example, as described later, copolymerizing ethylene, an α-olefin of 3 to 20 carbon atoms and a —SiXYZ group containing ethylene monomer represented by the formula (IV).

The second silicon-containing olefin copolymer of the present invention can be produced by, for example, as described later, copolymerizing ethylene, an α-olefin of 3 to 20 carbon atoms and a silicon-containing group represented by the formula (IV) i.e. —Si(X)(Y)(Z) group containing ethylene monomer.

More specifically, the second silicon-containing olefin copolymer of the present invention can be produced by copolymerizing ethylene, an α-olefin of 3 to 20 carbon atoms and a silicon-containing ethylene monomer having a reactive Si structure, and has:

(i) a molar ratio [ethylene/α-olefin] of ethylene to α-olefin of 3 to 20 carbon atoms of from 99/1 to 30/70, (ii) a content of the ethylene monomer having a silicon-containing group of from 0.1 to 10 mol % based on 100 mol % of the total amounts of ethylene, α-olefin and the ethylene monomer, and (iii) a branching index of not less than 0.70.

Examples of the α-olefin of 3 to 20 carbon atoms are propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicocene, 9-methyl-1-decene, 11-methyl-1-dodecene and 12-ethyl-1-tetradecene. Among them, α-olefins of 3 to 10 carbon atoms are preferably used, and particularly, propylene, 1-butene, 1-hexene and 1-octene are more preferably used. These α-olefins are used singly or in combination with two or more.

The compound having a reactive Si structure constituting the second silicon-containing olefin copolymer of the present invention is an ethylene monomer having a silicon-containing group represented by the formula (IV)

and specifically is a compound having a structure represented by the formula (V) or (VI):

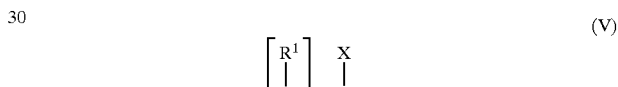

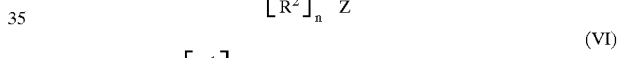

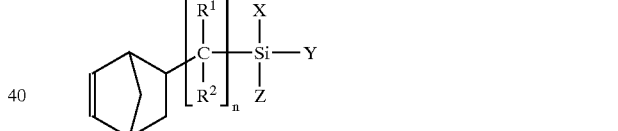

In the formulas (V) and (VI), $R^1$ and $R^2$ each are independently a hydrogen atom or an alkyl group of 1 to 3 carbon atoms.

Examples of the alkyl group of 1 to 3 carbon atoms may include methyl, ethyl, n-propyl and isopropyl.

Although n is an integer of 0 to 10, when n is two or more, the plural groups $R^1$ may be the same or different each other and the plural groups $R^2$ may be also the same or different each other. For example, when n is 2, it can have a structure of —CH(CH$_3$)—C(C$_2$H$_5$)(C$_3$H$_7$)—.

In the formulas (IV), (V) and (VI), X, Y and Z each are independently a group or atom selected from a hydrocarbon group of 1 to 6 carbon atoms, hydride, halogen, alkoxy group of 1 to 6 carbon atoms, acyloxy group, ketoximate group, amide group, acid amide group, aminoxy group, thioalkoxy group and amino group, at least one of X, Y and Z is selected from a halogen, alkoxy group of 1 to 6 carbon atoms, acyloxy group, ketoximate group, amide group, acid amide group, aminoxy group, thioalkoxy group and amino group.

Preferable examples of the hydrocarbon group of 1 to 6 carbon atoms are alkyl groups such as methyl, ethyl, n-propyl, isopropyl, n-butyl, isobutyl, tert-butyl, sec-butyl, pentyl and hexyl. Of these, alkyl groups of 1 to 3 carbon atoms are preferably used from the viewpoint of separation of residual monomers from a copolymer and cross-linking efficiency.

Examples of the alkoxy group of 1 to 6 carbon atoms are methoxy, ethoxy, n-propoxy, isopropoxy, n-butoxy, isobutoxy, tert-butoxy, sec-butoxy, pentyloxy and hexyloxy groups. Of these, alkoxy groups of 1 to 3 carbon atoms are preferably used in view of separation of residual monomers from a copolymer and cross-linking efficiency.

Examples of the halogen are chlorine, fluorine, bromine and iodine atoms.

Examples of the acyloxy group are acetoxy and benzoyloxy groups.

Examples of the ketoximate group are acetoxymate, dimethyl ketoximate, diethyl ketoximate and cyclohexylmate groups.

Examples of the amide group are dimethylamide, diethylamide, dipropylamide, dibutylamide and diphenylamide groups.

Examples of the acid amide group are carboxylic acid amide, maleic acid amide, acrylic acid amide and itaconic acid amide groups.

Examples of the thioalkoxy group are thiomethoxy, thioethoxy, thiopropoxy, thioisopropoxy, thioisobutoxy, sec-thiobutoxy, tert-thiobutoxy, thiopentyloxy, thiohexyloxy and thiophenoxy groups.

Examples of the amino group are dimethylamino, diethylamino, dipropylamino, dibutylamino and diphenylamino groups.

Of these, alkoxyl groups, particularly, alkoxyl groups of 1 to 4 carbon atoms are preferred.

In the formula (IV) of the silicon-containing group having ethylene monomer constituting the second silicon-containing olefin copolymer according to the present invention, at least one of X, Y and Z is selected from halogen, an alkoxy group of 1 to 6 carbon atoms, acyloxy group, ketoximate group, amide group, acid amide group, aminoxy group, thioalkoxy group and amino group.

Further, X, Y and Z each are preferably a hydrogen atom, a hydrocarbon group of 1 to 6 carbon atoms, an alkoxy group of 1 to 6 carbon atoms or a halogen.

In the most desirable case, X, Y and Z each are a hydrogen atom, a hydrocarbon group of 1 to 6 carbon atoms, an alkoxy group of 1 to 6 carbon atoms or a halogen and also at least one of X, Y and Z is an alkoxy group or a halogen.

Furthermore, among the above groups and atoms, X, Y and Z each are preferably a group or atom other than a hydrogen atom.

Examples of the silicon-containing ethylene monomer of the formula (V) may include:

allyl group containing compounds such as allyltrimethoxysilane, allylmethyldimethoxysilane, allyldimethylmethoxysilane, allyldimethoxychlorosilane and allyltriethoxysilane;

butenyl group containing compounds such as butenyltrimethoxysilane, butenylmethyldimethoxysilane, butenyldimethylmethoxysilane, butenyldimethoxychlorosilane and butenyltriethoxysilane; and pentenyl group containing compounds such as pentenyltrimethoxysilane, pentenylmethyldimethoxysilane, pentenyldimethylmethoxysilane, pentenyldimethoxychlorosilane and pentenyltriethoxysilane.

Examples of the silicon-containing group having ethylene monomer represented by the formula (VI) are as follows:

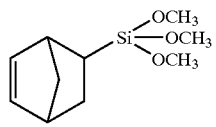

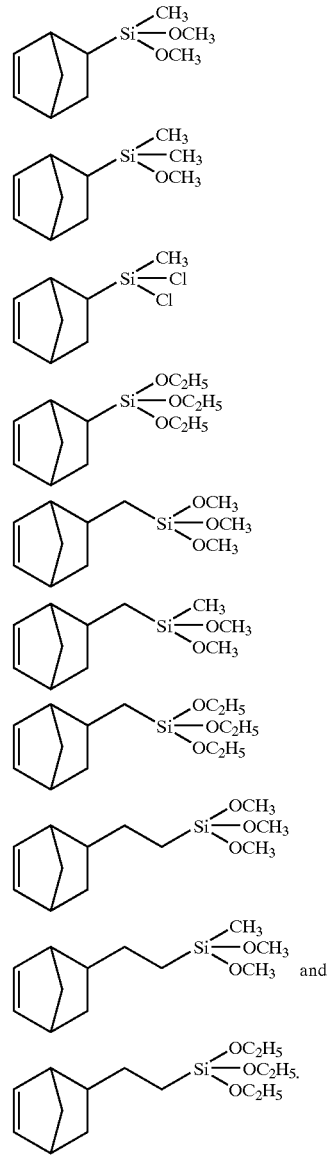

The silicon-containing group having ethylene monomer as described above can be produced by allowing a silicon-containing olefin compound represented the following formula (VII) to react with dicyclopentadiene or cyclopentadiene.

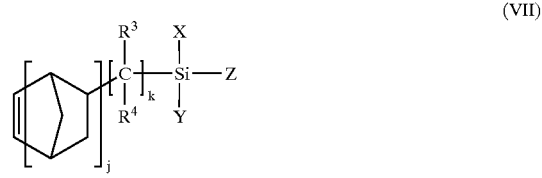

(VII)

In the formula (VII), $R^3$ and $R^4$ each are independently a hydrogen atom, an alkyl group of 1 to 3 carbon atoms and they may be the same or different each other, and further may vary in accordance with k.

Examples of the alkyl group of 1 to 3 carbon atoms as $R^3$ and $R^4$ may include methyl, ethyl, n-propyl and isopropyl.

X, Y and Z are the same as those in the formula (V) and each are independently an alkoxy group of 1 to 6 carbon atoms, halogen atom, alkyl group of 1 to 6 carbon atoms or hydrogen atom, and at least one of X, Y and Z is an alkoxy group or halogen atom.

Examples of the alkoxy group of 1 to 6 carbon atoms as X, Y and Z are methoxy, ethoxy, n-propyl, isopropyl, n-butyl, isobutyl and tert-butyl.

Examples of the halogen are fluorine, chlorine, bromine and iodine atoms.

Examples of the alkyl group having 1 to 6 carbon atoms may include methyl, ethyl, n-propyl, isopropyl, n-butyl, isobutyl, and tert-butyl.

K is an integer of 0 to 10, and j is 0 or 1.

Examples of the silicon-containing olefin compound of the formula (VII) may include silicon-containing olefin compounds such as:
vinyldimethoxymethylsilane,
vinyldiethoxymethylsilane,
vinyldi-n-propylmethylsilane,
vinyldiisopropylmethylsilane,
vinyldi-n-butylmethylsilane,
vinyldiisobutylmethylsilane,
vinyldimethoxyethylsilane,
vinyldimethoxy-n-propylsilane,
vinyldimethoxyisopropylsilane,
vinyldimethoxyn-butylsilane,
vinyldimethoxyisobutylsilane,
vinyldimethoxytert-butylsilane,
vinyldiethoxyethylsilane,
vinyldiethoxyn-propylsilane,
vinyldiethoxyisopropylsilane,
vinyldimethoxyhydrosilane,
vinyldiethoxyhydrosilane,
vinylmethoxydimethylsilane,
vinylethoxydimethylsilane,
vinyl-n-propyldimethylsilane,
vinylisopropyldimethylsilane,
vinyl-n-butyldimethylsilane,
vinylisobutyldimethylsilane,
vinylmethoxydiethylsilane,
vinylmethoxydi-n-propylsilane,
vinylmethoxydiisopropylsilane,
vinylmethoxydi-n-butylsilane,
vinylmethoxyisodibutylsilane,
vinylmethoxydi-tert-butylsilane,
vinylethoxydiethylsilane,
vinylethoxydi-n-propylsilane,
vinylethoxydiisopropylsilane,
vinylmethoxydihydrosilane,
vinylethoxydihydrosilane,
vinyldichloromethylsilane,
vinyldichloroethylsilane,
vinyldichloro-n-propylsilane,
vinyldichloroisopropylsilane,
vinyldichloro-n-butylsilane,
vinyldichloroisobutylsilane,
vinyldichlorotert-butylsilane,
vinyldichlorohydrosilane,
vinylchlorodimethylsilane,
vinylchlorodiethylsilane,
vinylchlorodi-n-propylsilane,
vinylchlorodiisopropylsilane,
vinylchlorodi-n-butylsilane,
vinylchloroisodibutylsilane,
vinylchlorodi-tert-butylsilane,
vinylchlorodihydrosilane,
allyldimethoxymethylsilane,
allyldiethoxymethylsilane,
allyldi-n-propylmethylsilane,
allyldiisopropylmethylsilane,
allyldi-n-butylmethylsilane,
allyldiisobutylmethylsilane,
allyldimethoxyethylsilane,
allyldimethoxy-n-propylsilane,
allyldimethoxyisopropylsilane,
allyldimethoxy-n-butylsilane,
allyldimethoxyisobutylsilane,
allyldimethoxytert-butylsilane,
allyldiethoxyethylsilane,
allyldiethoxyn-propylsilane,
allyldiethoxyisopropylsilane,
allyldimethoxyhydrosilane,
allyldiethoxyhydrosilane,
allylmethoxydimethylsilane,
allylethoxydimethylsilane,
allyl-n-propyldimethylsilane,
allylisopropyldimethylsilane,
allyln-butyldimethylsilane,
allylisobutyldimethylsilane,
allylmethoxydiethylsilane,
allylmethoxydi-n-propylsilane,
allylmethoxydiisopropylsilane,
allylmethoxydi-n-butylsilane,
allylmethoxyisodibutylsilane,
allylmethoxydi-tert-butylsilane,
allylethoxydiethylsilane,
allylethoxydi-n-propylsilane,
allylethoxydiisopropylsilane,
allylmethoxydihydrosilane,
allylethoxydihydrosilane,
allyldichloromethylsilane,
allyldichloroethylsilane,
allyldichloron-propylsilane,
allyldichloroisopropylsilane,
allyldichloron-butylsilane,
allyldichloroisobutylsilane,
allyldichlorotert-butylsilane,
allyldichlorohydrosilane,
allylchlorodimethylsilane,
allylchlorodiethylsilane,
allylchlorodi-n-propylsilane,
allylchlorodiisopropylsilane,
allylchlorodi-n-butylsilane,
allylchloroisodibutylsilane,
allylchlorodi-tert-butylsilane,
allylchlorodihydrosilane,
3-butenyldimethoxymethylsilane,
3-butenyldiethoxymethylsilane,
3-butenyldi-n-propylmethylsilane,
3-butenyldiisopropylmethylsilane,
3-butenyldi-n-butylmethylsilane,
3-butenyldiisobutylmethylsilane,
3-butenyldimethoxyethylsilane,
3-butenyldimethoxy-n-propylsilane,
3-butenyldimethoxyisopropylsilane,
3-butenyldimethoxyn-butylsilane,
3-butenyldimethoxyisobutylsilane,
3-butenyldimethoxytert-butylsilane,
3-butenyldiethoxyethylsilane,
3-butenyldiethoxyn-propylsilane,
3-butenyldiethoxyisopropylsilane, 3-butenyldimethoxyhydrosilane,
3-butenyldiethoxyhydrosilane,
3-butenylmethoxydimethylsilane,
3-butenylethoxydimethylsilane,
3-butenyl-n-propyldimethylsilane,
3-butenylisopropyldimethylsilane,
3-butenyl-n-butyldimethylsilane,
3-butenylisobutyldimethylsilane,
3-butenylmethoxydiethylsilane,
3-butenylmethoxydi-n-propylsilane,
3-butenylmethoxydiisopropylsilane,
3-butenylmethoxydi-n-butylsilane,
3-butenylmethoxyisodibutylsilane,
3-butenylmethoxytert-butylsilane,
3-butenylethoxydiethylsilane,
3-butenylethoxydi-n-propylsilane,
3-butenylethoxydiisopropylsilane,
3-butenylmethoxydihydrosilane,
3-butenylethoxydihydrosilane,
3-butenyldichloromethylsilane,
3-butenyldichloroethylsilane,
3-butenyldichloro-n-propylsilane,
3-butenyldichloroisopropylsilane,
3-butenyldichloro-n-butylsilane,
3-butenyldichloroisobutylsilane,
3-butenyldichlorotert-butylsilane,
3-butenyldichlorohydrosilane,
3-butenylchlorodimethylsilane,
3-butenylchlorodiethylsilane,
3-butenylchlorodi-n-propylsilane,
3-butenylchlorodiisopropylsilane,
3-butenylchlorodi-n-butylsilane,
3-butenylchloroisodibutylsilane,
3-butenylchlorodi-tert-butylsilane,
3-butenylchlorodihydrosilane,
4-pentenyldimethoxymethylsilane,
4-pentenylmethoxydimethylsilane,
4-pentenyldichloromethylsilane,
4-pentenylchlorodimethylsilane,
5-hexenyldimethoxymethylsilane,
5-hexenylmethoxydimethylsilane,
5-hexenyldichloromethylsilane,
5-hexenylchlorodimethylsilane,
7-octenyldimethoxymethylsilane,
7-octenylmethoxydimethylsilane,
7-octenyldichloromethylsilane,
7-octenylchlorodimethylsilane,
9-decenyldimethoxymethylsilane,
9-decenylmethoxydimethylsilane,
9-decenyldichloromethylsilane,
9-decenylchlorodimethylsilane,
11-dodecenyldimethoxymethylsilane,
11-dodecenylmethoxydimethylsilane,
11-dodecenyldichloromethylsilane, and
11-dodeceylchlorodimethylsilane.

Further, examples of the silicon-containing olefin compound of the formula (VII) may include silyl norbornene compounds (silicon-containing olefin compounds) such as:
bicyclo[2.2.1]hept-5-ene-2-yldimethoxymethylsilane,
bicyclo[2.2.1]hept-5-ene-2-yldiethoxymethylsilane,
bicyclo[2.2.1]hept-5-ene-2-yldi-n-propylmethylsilane,
bicyclo[2.2.1]hept-5-ene-2-yldiisopropylmethylsilane,
bicyclo[2.2.1]hept-5-ene-2-yldi-n-butylmethylsilane,
bicyclo[2.2.1]hept-5-ene-2-yldiisobutylmethylsilane,
bicyclo[2.2.1]hept-5-ene-2-yldimethoxyethylsilane,
bicyclo[2.2.1]hept-5-ene-2-yldimethoxy-n-propylsilane,
bicyclo[2.2.1]hept-5-ene-2-yldimethoxyisopropylsilane,
bicyclo[2.2.1]hept-5-ene-2-yldimethoxy-n-butylsilane,
bicyclo[2.2.1]hept-5-ene-2-yldimethoxyisobutylsilane,
bicyclo[2.2.1]hept-5-ene-2-yldimethoxytert-butylsilane,
bicyclo[2.2.1]hept-5-ene-2-yldiethoxyethylsilane,
bicyclo[2.2.1]hept-5-ene-2-yldiethoxy-n-propylsilane,
bicyclo[2.2.1]hept-5-ene-2-yldimethoxyisopropylsilane,
bicyclo[2.2.1]hept-5-ene-2-yldimethoxyhydrosilane,
bicyclo[2.2.1]hept-5-ene-2-yldiethoxyhydrosilane,
bicyclo[2.2.1]hept-5-ene-2-ylmethoxydimethylsilane,
bicyclo[2.2.1]hept-5-ene-2-ylethoxydimethylsilane,
bicyclo[2.2.1]hept-5-ene-2-yl-n-propyldimethylsilane,
bicyclo[2.2.1]hept-5-ene-2-ylisopropyldimethylsilane,
bicyclo[2.2.1]hept-5-ene-2-yl-n-butyldimethylsilane,
bicyclo[2.2.1]hept-5-ene-2-ylisobutyldimethylsilane,
bicyclo[2.2.1]hept-5-ene-2-ylmethoxydiethylsilane,
bicyclo[2.2.1]hept-5-ene-2-ylmethoxydi-n-propylsilane,
bicyclo[2.2.1]hept-5-ene-2-ylmethoxydiisopropylsilane,
bicyclo[2.2.1]hept-5-ene-2-ylmethoxydi-n-butylsilane,
bicyclo[2.2.1]hept-5-ene-2-ylmethoxyisodibuthylsilane,
bicyclo[2.2.1]hept-5-ene-2-ylmethoxydi-tert-buthylsilane,
bicyclo[2.2.1]hept-5-ene-2-ylethoxydiethylsilane,
bicyclo[2.2.1]hept-5-ene-2-ylethoxydi-n-propylsilane,
bicyclo[2.2.1]hept-5-ene-2-ylethoxydiisopropylsilane,
bicyclo[2.2.1]hept-5-ene-2-ylmethoxydihydrosilane,
bicyclo[2.2.1]hept-5-ene-2-ylethoxydihydrosilane,
bicyclo[2.2.1]hept-5-ene-2-yldichloromethylsilane,
bicyclo[2.2.1]hept-5-ene-2-yldichloroethylsilane,
bicyclo[2.2.1]hept-5-ene-2-yldichloro-n-propylsilane,
bicyclo[2.2.1]hept-5-ene-2-yldichloroisopropylsilane,
bicyclo[2.2.1]hept-5-ene-2-yldichloro-n-butylsilane,
bicyclo[2.2.1]hept-5-ene-2-yldichloroisobu.tylsilane,
bicyclo[2.2.1]hept-5-ene-2-yldichlorotert-butylsilane,
bicyclo[2.2.1]hept-5-ene-2-yldichlorohydrosilane,
bicyclo[2.2.1]hept-5-ene-2-ylchlorodimethylsilane,
bicyclo[2.2.1]hept-5-ene-2-ylchlorodiethylsilane,
bicyclo[2.2.1]hept-5-ene-2-ylchlorodi-n-propylsilane,
bicyclo[2.2.1]hept-5-ene-2-ylchlorodiisopropylsilane,
bicyclo[2.2.1]hept-5-ene-2-ylchlorodi-n-butylsilane,
bicyclo[2.2.1]hept-5-ene-2-ylchloroisodibutylsilane,
bicyclo[2.2.1]hept-5-ene-2-ylchlorodi-tert-butylsilane,
bicyclo[2.2.1]hept-5-ene-2-ylchlorodihydrosilane,
(bicyclo[2.2.1]hept-5-ene-2-ylmethyl)dimethoxymethylsilane,
(bicyclo[2.2.1]hept-5-ene-2-ylmethyl)diethoxymethylsilane,
(bicyclo[2.2.1]hept-5-ene-2-ylmethyl)di-n-propylmethylsilane,
(bicyclo[2.2.1]hept-5-ene-2-ylmethyl)diisopropylmethylsilane,
(bicyclo[2.2.1]hept-5-ene-2-ylmethyl)di-n-butylmethylsilane,
(bicyclo[2.2.1]hept-5-ene-2-ylmethyl)diisobutylmethylsilane,
(bicyclo[2.2.1]hept-5-ene-2-ylmethyl)di-methoxyethylsilane,
(bicyclo[2.2.1]hept-5-ene-2-ylmethyl)dimethoxy-n-propylsilane,
(bicyclo[2.2.1]hept-5-ene-2-ylmethyl)dimethoxyisopropylsilane,
(bicyclo[2.2.1]hept-5-ene-2-ylmethyl)dimethoxy-n-butylsilane,
(bicyclo[2.2.1]hept-5-ene-2-ylmethyl)dimethoxyisobutylsilane,
(bicyclo[2.2.1]hept-5-ene-2-ylmethyl)dimethoxytert-butylsilane,
(bicyclo[2.2.1]hept-5-ene-2-ylmethyl)diethoxyethylsilane, (bicyclo[2.2.1]hept-5-ene-2-ylmethyl)diethoxy-n-propylsilane,
(bicyclo[2.2.1]hept-5-ene-2-ylmethyl)diethoxyisopropylsilane,
(bicyclo[2.2.1]hept-5-ene-2-ylmethyl)dimethoxyhydrosilane,
(bicyclo[2.2.1]hept-5-ene-2-ylmethyl)diethoxyhydrosilane,
(bicyclo[2.2.1]hept-5-ene-2-ylmethyl)methoxydimethylsilane,
(bicyclo[2.2.1]hept-5-ene-2-ylmethyl)ethoxydimethylsilane,
(bicyclo[2.2.1]hept-5-ene-2-ylmethyl)n-propyldimethylsilane,
(bicyclo[2.2.1]hept-5-ene-2-ylmethyl)isopropyldimethylsilane,
(bicyclo[2.2.1]hept-5-ene-2-ylmethyl)n-butyldimethylsilane,
(bicyclo[2.2.1]hept-5-ene-2-ylmethyl)isobutyldimethylsilane,
(bicyclo[2.2.1]hept-5-ene-2-ylmethyl)methoxydiethylsilane,
(bicyclo[2.2.1]hept-5-ene-2-ylmethyl)methoxydi-n-propylsilane,
(bicyclo[2.2.1]hept-5-ene-2-ylmethyl)methoxydi-iso-propylsilane,
(bicyclo[2.2.1]hept-5-ene-2-ylmethyl)methoxydi-n-butylsilane,
(bicyclo[2.2.1]hept-5-ene-2-ylmethyl)methoxyisodibutylsilane,
(bicyclo[2.2.1]hept-5-ene-2-ylmethyl)methoxydi-tert-butylsilane,
(bicyclo[2.2.1]hept-5-ene-2-ylmethyl)ethoxydiethylsilane,
(bicyclo[2.2.1]hept-5-ene-2-ylmethyl)ethoxydi-n-propylsilane,
(bicyclo[2.2.1]hept-5-ene-2-ylmethyl)ethoxydiisopropylsilane,
(bicyclo[2.2.1]hept-5-ene-2-ylmethyl)methoxydihydrosilane,
(bicyclo[2.2.1]hept-5-ene-2-ylmethyl)ethoxydihydrosilane,
(bicyclo[2.2.1]hept-5-ene-2-ylmethyl)dichloromethylsilane,
(bicyclo[2.2.1]hept-5-ene-2-ylmethyl)dichloroethylsilane,
(bicyclo[2.2.1]hept-5-ene-2-ylmethyl)dichloro-n-propylsilane,
(bicyclo[2.2.1]hept-5-ene-2-ylmethyl)dichloroisopropylsilane,
(bicyclo[2.2.1]hept-5-ene-2-ylmethyl)dichloro-n-butylsilane,
(bicyclo[2.2.1]hept-5-ene-2-ylmethyl)dichloroisobutylsilane,
(bicyclo[2.2.1]hept-5-ene-2-ylmethyl)dichlorotert-butylsilane,
(bicyclo[2.2.1]hept-5-ene-2-ylmethyl)dichlorohydrosilane,
(bicyclo[2.2.1]hept-5-ene-2-ylmethyl)chlorodimethylsilane,
(bicyclo[2.2.1]hept-5-ene-2-ylmethyl)chlorodiethylsilane,
(bicyclo[2.2.1]hept-5-ene-2-ylmethyl)chlorodi-n-propylsilane,
(bicyclo[2.2.1]hept-5-ene-2-ylmethyl)chlorodiisopropylsilane,
(bicyclo[2.2.1]hept-5-ene-2-ylmethyl)chlorodi-n-butylsilane,
(bicyclo[2.2.1]hept-5-ene-2-ylmethyl)chloroisodibutylsilane,
(bicyclo[2.2.1]hept-5-ene-2-ylmethyl)chlorodi-tert-butylsilane,
(bicyclo[2.2.1]hept-5-ene-2-ylmethyl)chlorodihydrosilane,
(2-bicyclo[2.2.1]hept-5-ene-2-ylethyl)dimethoxymethylsilane,
(2-bicyclo[2.2.1]hept-5-ene-2-ylethyl)diethoxymethylsilane,
(2-bicyclo[2.2.1]hept-5-ene-2-ylethyl)di-n-propylmethylsilane,
(2-bicyclo[2.2.1]hept-5-ene-2-ylethyl)diisopropylmethylsilane,
(2-bicyclo[2.2.1]hept-5-ene-2-ylethyl)di-n-butylmethylsilane,
(2-bicyclo[2.2.1]hept-5-ene-2-ylethyl)diisobutylmethylsilane,
(2-bicyclo[2.2.1]hept-5-ene-2-ylethyl)dimethoxyethylsilane,
(2-bicyclo[2.2.1]hept-5-ene-2-ylethyl)dimethoxy-n-propylsilane,
(2-bicyclo[2.2.1]hept-5-ene-2-ylethyl)dimethoxyisopropylsilane,
(2-bicyclo[2.2.1]hept-5-ene-2-ylethyl)dimethoxy-n-butylsilane,
(2-bicyclo[2.2.1]hept-5-ene-2-ylethyl)dimethoxyisobutylsilane,
(2-bicyclo[2.2.1]hept-5-ene-2-ylethyl)dimethoxytert-butylsilane,
(2-bicyclo[2.2.1]hept-5-ene-2-ylethyl)diethoxyethylsilane,
(2-bicyclo[2.2.1]hept-5-ene-2-ylethyl)di-ethoxy-n-propylsilane,
(2-bicyclo[2.2.1]hept-5-ene-2-ylethyl)diethoxyisopropylsilane,
(2-bicyclo[2.2.1]hept-5-ene-2-ylethyl)dimethoxyhydrosilane,
(2-bicyclo[2.2.1]hept-5-ene-2-ylethyl)diethoxyhydrosilane,
(2-bicyclo[2.2.1]hept-5-ene-2-ylethyl)methoxydimethylsilane,
(2-bicyclo[2.2.1]hept-5-ene-2-ylethyl)ethoxydimethylsilane,
(2-bicyclo[2.2.1]hept-5-ene-2-ylethyl)n-propyldimethylsilane,
(2-bicyclo[2.2.1]hept-5-ene-2-ylethyl)isopropyldimethylsilane,
(2-bicyclo[2.2.1]hept-5-ene-2-ylethyl)n-butyldimethylsilane,
(2-bicyclo[2.2.1]hept-5-ene-2-ylethyl)isobutyldimethylsilane,
(2-bicyclo[2.2.1]hept-5-ene-2-ylethyl)methoxydiethylsilane,
(2-bicyclo[2.2.1]hept-5-ene-2-ylethyl)methoxydi-n-propylsilane,
(2-bicyclo[2.2.1]hept-5-ene-2-ylethyl)methoxydiisopropylsilane,
(2-bicyclo[2.2.1]hept-5-ene-2-ylethyl)methoxydi-n-butylsilane,
(2-bicyclo[2.2.1]hept-5-ene-2-ylethyl)methoxyisodibutylsilane,
(2-bicyclo[2.2.1]hept-5-ene-2-ylethyl)methoxydi-tert-butylsilane,
(2-bicyclo[2.2.1]hept-5-ene-2-ylethyl)ethoxydiethylsilane,
(2-bicyclo[2.2.1]hept-5-ene-2-ylethyl)ethoxydi-n-propylsilane,
(2-bicyclo[2.2.1]hept-5-ene-2-ylethyl)ethoxydiisopropylsilane,
(2-bicyclo[2.2.1]hept-5-ene-2-ylethyl)methoxydihydrosilane,
(2-bicyclo[2.2.1]hept-5-ene-2-ylethyl)ethoxydihydrosilane,
(2-bicyclo[2.2.1]hept-5-ene-2-ylethyl)dichloromethylsilane,
(2-bicyclo[2.2.1]hept-5-ene-2-ylethyl)dichloroethylsilane,
(2-bicyclo[2.2.1]hept-5-ene-2-ylethyl)dichloro-n-propylsilane, (2-bicyclo[2.2.1]hept-5-ene-2-ylethyl)dichloroisopropylsilane,
(2-bicyclo[2.2.1]hept-5-ene-2-ylethyl)dichloro-n-butylsilane,
(2-bicyclo[2.2.1]hept-5-ene-2-ylethyl)dichloroisobutylsilane,
(2-bicyclo[2.2.1]hept-5-ene-2-ylethyl)dichlorotert-butylsilane,
(2-bicyclo[2.2.1]hept-5-ene-2-ylethyl)dichlorohydrosilane,
(2-bicyclo[2.2.1]hept-5-ene-2-ylethyl)chlorodimethylsilane,
(2-bicyclo[2.2.1]hept-5-ene-2-ylethyl)chlorodiethylsilane,
(2-bicyclo[2.2.1]hept-5-ene-2-ylethyl)chlorodi-n-propylsilane,
(2-bicyclo[2.2.1]hept-5-ene-2-ylethyl)chlorodiisopropylsilane,
(2-bicyclo[2.2.1]hept-5-ene-2-ylethyl)chlorodi-n-butylsilane,
(2-bicyclo[2.2.1]hept-5-ene-2-ylethyl)chloroisodibutylsilane,
(2-bicyclo[2.2.1]hept-5-ene-2-ylethyl)chlorodi-tert-butylsilane,
(2-bicyclo[2.2.1]hept-5-ene-2-ylethyl)chlorodihydrosilane,
(3-bicyclo[2.2.1]hept-5-ene-2-ylpropyl)dimethoxymethylsilane,
(3-bicyclo[2.2.1]hept-5-ene-2-ylpropyl)methoxydimethylsilane,
(3-bicyclo[2.2.1]hept-5-ene-2-ylpropyl)dichloromethylsilane,
(3-bicyclo[2.2.1]hept-5-ene-2-ylpropyl)chlorodimethylsilane,
(4-bicyclo[2.2.1]hept-5-ene-2-ylbutyl)dimethoxymethylsilane,
(4-bicyclo[2.2.1]hept-5-ene-2-ylbutyl)methoxydimethylsilane,
(4-bicyclo[2.2.1]hept-5-ene-2-ylbutyl)dichloromethylsilane,
(4-bicyclo[2.2.1]hept-5-ene-2-ylbutyl)chlorodimethylsilane,
(6-bicyclo[2.2.1]hept-5-ene-2-ylhexyl)dimethoxymethylsilane,
(6-bicyclo[2.2.1]hept-5-ene-2-ylhexyl)methoxydimethylsilane,
(6-bicyclo[2.2.1]hept-5-ene-2-ylhexyl)dichloromethylsilane,
(6-bicyclo[2.2.1]hept-5-ene-2-ylhexyl)chlorodimethylsilane,
(8-bicyclo[2.2.1]hept-5-ene-2-yloctyl)dimethoxymethylsilane,
(8-bicyclo[2.2.1]hept-5-ene-2-yloctyl)methoxydimethylsilane,
(8-bicyclo[2.2.1]hept-5-ene-2-yloctyl)dichloromethylsilane,
(8-bicyclo[2.2.1]hept-5-ene-2-yloctyl)chlorodimethylsilane,
(10-bicyclo[2.2.1]hept-5-ene-2-yldecyl)dimethoxymethylsilane,
(10-bicyclo[2.2.1]hept-5-ene-2-yldecyl)methoxydimethylsilane,
(10-bicyclo[2.2.1]hept-5-ene-2-yldecyl)dichloromethylsilane and
(10-bicyclo[2.2.1]hept-5-ene-2-yldecyl)chlorodimethylsilane.

In the preparation of the ethylene monomer, dicyclopentadiene having a purity of about 95%, which is produced industrially and commercially available, can be used. For example, it is industrially produced by a method such that cyclopentadiene present in a C5 fraction from a naphtha cracker, etc is dimerized with heating to convert into dicyclopentadiene and recovered by fractional distillation, and then can be submitted for use. Furthermore, the dicyclopentadiene industrially produced may be purified with distillation or the like and then highly purified one may be used.

The cyclopentadiene used in the preparation of the ethylene monomer can be easily obtained by thermal decomposing the above dicyclopentadiene.

The reaction of the silicon-containing olefin compound of the formula (VII) with dicyclopentadiene or cyclopentadiene, which are staring materials for the second silicon-containing olefin copolymer of the present invention, is theoretically a reaction of 1 mol of the silicon-containing olefin compound of the formula (VII) with 1 mol in terms of cyclopentadiene. Furthermore, the reaction can be carried out in an arbitrary molar ratio. It is used in terms of cyclopentadiene in an amount of preferably from 0.01 to 100 mol, more preferably from 0.05 to 20 mol and further preferably 0.1 to 10 mol based on 1 mol of the silicon-containing olefin compound of the formula (VII). The cyclopentadiene is preferably used in the above amount of from 0.01 to 100 mol because the sufficient reaction rate can be secured.

In the present invention, although the reaction proceeds particularly without use of a solvent, the solvent may be used in accordance with the necessity. The kind of the solvent used herein is not particularly limited as long as the reaction is not inhibited. Examples of the solvent may include aliphatic hydrocarbons such as pentane, hexane, heptane and cyclohexane; aromatic hydrocarbons such as benzene, toluene, xylene, ethylbenzene and cumene; halides such as dichloromethane, chloroform, carbon tetrachloride, tetrachloroethane, chlorobenzene, dichlorobenzene and bromobenzene; ethers such as diethylether, tetrahydrofurane, 1,4-dioxane, ethylene glycol dimethyl ether and ethylene glycol diethylether; nitrites such as acetonitrile, propionitrile and benzonitrile; and esters such-as ethyl acetate and the like. These may be used singly or in a mixture of two or more, and the amount thereof is appropriately selected.

In the present invention, though the temperature in carrying out the reaction depends on whether dicyclopentadiene or cyclopentadiene is reacted with the silicon-containing olefin compound of the formula (VII), the temperature is preferably from 0 to 250° C., more preferably 10 to 230° C., further more preferably 20 to 200° C. The temperature is preferably not lower than 0° C. from the viewpoint of the reaction rate, and it is preferably not higher than 250° C., from the viewpoint of the stability of the starting materials and a resulting product, though the above reaction can be carried out in the range outside of the above.

In carrying out the reaction of the present invention, the pressure is not particularly limited and varies in accordance with the kind of the starting materials. The reaction is usually carried out at a pressure of from atmospheric pressure to 10 MPa.

The reaction time is preferably from 0.05 to 300 hr, more preferably 0.1 to 200 hr, further more preferably 0.2 to 150 hr though the reaction time varies according to the reaction temperature. The reaction can be carried out in the time range outside of the above. From the viewpoint of the yield, the reaction time is preferably not less than 0.05 hr and from the viewpoint of attaining the sufficient productivity, it is preferably not more than 300 hr.

In the reaction of the silicon-containing olefin compound of the formula (VII) with dicyclopentadiene or cyclopentadiene according to the present invention, the reaction type is not particularly limited, and the reaction can be carried out by any one of batch-wise, semi-batch-wise and continuous methods.

For example, there are a reaction method of feeding cyclopentadiene prepared by thermal decomposing dicyclopentadiene into a reactor in which the olefin compound of the formula (VII) has been introduced beforehand, a reaction method of feeding the olefin compound of the formula (VII) and dicyclopnetadiene simultaneously into a reactor, and a reaction method of continuously feeding the olefin compound of the formula (VII) and dicyclopnetadiene simultaneously into a reactor while continuously drawing off a reaction liquid mixture.

In the first silicon-containing olefin copolymer of the present invention, the molar ratio (ethylene/α-olefin) of ethylene to an α-olefin of 3 to 20 carbon atoms, or the molar ratio (a)/(b) of constituent unit derived from (a) —CH$_2$—CH$_2$— to constituent unit derived from (b) —CH$_2$—CHR— has an upper limit of 99/1, preferably 97/3, more preferably 95/5, further more preferably 92/8. According to decreasing the ethylene proportion such that the molar ratio varies to 85/15, 80/20, 75/25, 70/30, 68/32, the desirable result can be obtained. The molar ratio (ethylene/α-olefin) has a lower limit of 30/70, preferably 40/60, more preferably 50/50, further more preferably 55/45, especially 60/40. Specifically, the molar ratio (ethylene/α-olefin) is, for example, from 99/1 to 30/70, preferably 97/3 to 40/60, more preferably 95/5 to 50/50, further more preferably 92/8 to 55/45.

When the ethylene proportion is larger than the above range, a resulting molded article loses flexibility, on the other hand, when it is smaller than the above range, a resulting molded article deteriorates in heat aging characteristics.

The first and second silicon-containing olefin copolymers according to the present invention have an intrinsic viscosity [η] as measured in decalin at 135° C., which is not particularly limited, of usually from 0.1 to 10 dl/g. In general, the intrinsic viscosity [η] has an upper limit of preferably 6 dl/g, more preferably 4 dl/g, further more preferably 3.5 dl/g, still more preferably 2 dl/g. It is preferred that the upper limit of the intrinsic viscosity [η] lowes so as to be 1 dl/g, 0.7 dl/g and 0.6 dl/g. The intrinsic viscosity [η] has a lower limit of preferably 0.2 dl/g, more preferably 0.3 dl/g. When the intrinsic viscosity [η] is in the above range, it is possible to prepare molded articles having excellent strength properties and resistance to compression set and also to prepare a cross-linkable rubber composition having excellent processability. Specifically, the intrinsic viscosity [η] is in the range of from preferably 0.2 to 6 dl/g, more preferably 0.3 to 4 dl/g, most preferably 0.3 to 3.5 dl/g. In other preferred embodiment, the intrinsic viscosity [η] is in the range of from 0.1 to 2 dl/g, preferably 0.1 to 1 dl/g, more preferably 0.1 to 0.7 dl/g, most preferably 0.2 to 0.6 dl/g. The silicon-containing olefin copolymer having an intrinsic viscosity [η] in the above range is particularly preferable as sealing materials, potting materials, coating materials and adhesives.

The second silicon-containing olefin copolymer of the present invention contains the ethylene monomer having the silicon-containing group of the formula (IV) in an amount of from 0.1 to 10 mol %, preferably 0.1 to 5 mol %, more preferably 0.1 to 3 mol % based on 100 mol % of the total amount of ethylene, α-olefin and the ethylene monomer. The first silicon-containing olefin copolymer of the present invention contains the silicon-containing constituent unit having the silicon-containing group of the formula (I) in an amount of from 0.1 to 10 mol %, preferably 0.1 to 5 mol %, more preferably 0.1 to 3 mol % based on 100 mol % of the total amount of (a) the constituent unit derived from —CH$_2$—CH$_2$—, (b) the constituent unit derived from —CH$_2$—CHR— and the silicon-containing constituent unit. When the silicon-containing constituent unit having the silicon-containing group of the formula (I) is in the above range, it is possible to prepare a molded article having excellent strength properties and resistance to compression set and also to prepare a cross-linkable rubber composition having excellent storage stability.

The first and second silicon-containing olefin copolymers according to the present invention have a number average molecular weight (Mn) and an iodine value (IV), which satisfy the following formula,

| | |
|---|---|
| generally | IV < 33800/Mn, |
| preferably | IV < 25400/Mn, |
| more preferably | IV < 20000/Mn, |
| further more preferably | IV < 17800/Mn, and |
| still more preferably | IV < 15000/Mn |

The first and second silicon-containing olefin copolymers have an iodine value in the above range can prepare a molded article having excellent heat aging characteristics and also a cross-linkable rubber composition. In particular, in this case, the copolymers are suitable for use of sealing materials in need of weathering resistance and heat aging characteristics.

The first and second silicon-containing olefin copolymers according to the present invention have a branching index, which is not particularly limited. The branching index has a lower limit of usually not less than 0.70, preferably not less than 0.75, more preferably not less than 0.80, further more preferably not less than 0.85, still more preferably not less than 0.90. In the above range, the branching index is preferably not less than 0.93, more preferably not less than 0.95, further more preferably not less than 0.97, especially not less than 0.99.

The branching index has an upper limit, which is not particularly limited and is generally not more than 1.0, preferably not more than 1.00. The first and second silicon-containing olefin copolymers having a branching index in the above range can prepare a silicon-containing olefin copolymer rubber having excellent dynamic fatigue characteristics and particularly excellent properties as sealing materials. In one embodiment of the present invention, the first and second silicon-containing olefin copolymers have a branching index of from 0.70 to 1.0, preferably 0.75 to 1.0, more preferably 0.8 to 1.0. Additionally, the branching index is preferably from 0.85 to 1.0, more preferably 0.90 to 1.0, further more preferably 0.93 to 1.0, moreover preferably 0.95 to 1.0, still more preferably 0.97 to 1.0, most preferably 0.99 to 1.0. The first and second silicon-containing olefin copolymers having a branching index in the above range have particularly excellent dynamic fatigue characteristics, processability, strength and elongation so that they exhibit excellent properties as sealing materials. The branching index can be controlled by selecting the catalyst as described later.

The first and second silicon-containing olefin copolymers according to the present invention satisfy the above properties and also have a molecular weight distribution (Mw/Mn), as measured in GPC, of from 1.0 to 10, preferably 1.5 to 10, more preferably 1.7 to 5, further more preferably 1.8 to 4, moreover preferably 1.8 to 3.5. The silicon-containing olefin copolymers having a molecular weight distribution (Mw/Mn) in the above range can prepare a cross-linkable rubber composition having excellent processability and strength properties. The first and second silicon-containing olefin copolymers according to the present invention are preferably random copolymers.

[Process for Producing the Silicon-containing Olefin Copolymer]

The first and second silicon-containing olefin copolymers (hereinafter simply referred to as silicon-containing olefin copolymer according to the present invention) can be synthesized by a metallocene catalyst, or a Ziegler catalyst containing a vanadium compound and an organoaluminum compound as main components.

Particularly, a metallocene catalyst, which comprises a metallocene compound of a Group IVB transition metal of the Periodic Table, an organoaluminum oxy compound and/or an ionized ionic compound is preferably used as the metallocene compound.

Firstly, the metallocene catalyst is described.

The metallocene compound of a Group 4 transition metal of the Periodic Table is represented by the following formula (i).

$$MLx \qquad (i)$$

In the formula (i), M is a Group 4 transition metal of the Periodic Table, specifically, zirconium, titanium or hafnium and x is a valence of a transition metal.

L is a ligand coordinating to a transition metal, and at least one of the ligands L is a ligand having a cyclopentadienyl skeleton and the ligand having a cyclopentadienyl skeleton may have a substituent.

Examples of the ligand having a cyclopentadienyl skeleton may include alkyl or cycloalkyl-substituted cyclopentadienyl groups such as cyclopentadienyl group, methylcyclopentadienyl group, ethylcyclopentadienyl group, n- or i-propylcyclopentadienyl group, n-, i-, sec- or t-butylcyclopentadienyl group, dimethylcyclopentadienyl group, trimethylcyclopentadienyl group, tetramethylcyclopentadienyl group, pentamethylcyclopentadienyl group, methylethylcyclopentadienyl group, methylpropylcyclopentadienyl group and methylbutylcyclopentadienyl group, and further may include indenyl group, 4,5,6,7-tetrahydroindenyl group and fluorenyl group.

These groups may be substituted with a halogen atom or a trialkyl sillyl group.

Of these, an alkyl-substituted cyclopentadienyl group is particularly preferred.

When the compound of the formula (i) has two or more groups having a cyclopentadienyl skeleton as a ligand L, two of the groups having a cyclopentadienyl skeleton may be bonded through an alkylene group such as ethylene and propylene, a substituted alkylene group such as isopropylidene and diphenyl methylene, a silylene group and a substituted silylene group such as dimethyl silylene, diphenyl silylene and methylphenyl silylene.

Examples of L other than the ligands L having a cyclopentadienyl skeleton may include a hydrocarbon groups of 1 to 12 carbon atoms, alkoxy groups, aryloxy groups, sulfonic acid containing groups (—$SO_3Ra$) (wherein Ra is an alkyl group, an alkyl group substituted with a halogen atom, an aryl group or an aryl group substituted with a halogen atom or alkyl group), a halogen atom and a hydrogen atom.

Examples of the halogen atom may include fluorine, chlorine, bromine and iodine.

Examples of the metallocene compounds wherein M is zirconium and at least two ligands having a cyclopentadienyl skeleton are contained are described below;
bis(methylcyclopentadienyl)zirconium dichloride,
bis(ethylcyclopentadienyl)zirconium dichloride,
bis(n-propylcyclopentadienyl)zirconium dichloride,
bis(indenyl)zirconium dichloride and
bis(4,5,6-tetrahydroindenyl)zirconium dichloride.

Further examples of the metallocene compounds may include compounds obtainable by replacing a zirconium metal with a titanium metal or hafnium metal in the above compounds.

In the present invention, compounds represented by the following formula (ii) can be also used as the metallocene compound.

$$L^1M^1X_2 \qquad (ii)$$

In the formula, M is a Group 4 metal or lanthanoide metal in the Periodic Table, $L^1$ is a derivative of a delocalized π-bonding group and endows a constrained geometrical configuration to the active site of the metal $M^1$, and X is independently a hydrogen atom, a halogen atom, a hydrocarbon group, silyl group or gelmyl group having 20 or less carbon, silicon or germanium atoms.

Of the compounds of the formula (ii), compounds represented by the following formula (iii) are preferred.

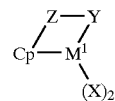

(iii)

In the formula, $M^1$ is titanium, zirconium, or hafnium, and X is the same as in the above.

Cp is π-bonded to $M^1$, and a substituted cyclopentadienyl group having a substituent Z.

Z is oxygen, sulfur, boron or a Group 14 element in the Periodic Table such as silicon, germanium or tin, Y is a ligand containing nitrogen, phosphorous, oxygen or sulfur, and Z and Y may form a condensed ring together.

Examples of the compound of the formula (iii) may include:
[dimethyl(t-butylamide)(tetramethyl-$\eta^5$-cyclopentadienyl)silane]titanium dichloride,
[(t-butylamide)(tetramethyl-$\eta^5$-cyclopenta-dienyl)-1,2-ethanediyl]titanium dichloride,
[dibenzyl(t-butylamide)(tetramethyl-$\eta^5$-cyclopentadienyl)silane]titanium dichloride,
[dimethyl(t-butylamide)(tetramethyl-$\eta^5$-cyclopentadienyl)silane]dibenzyl titanium,
[dimethyl(t-butylamide)(tetramethyl-$\eta^5$-cyclopentadienyl)silane] dimethyl titanium,
[(t-butylamide)(tetramethyl-$\eta^5$-cyclopentadienyl)-1,2-ethanediyl]dibenzyl titanium,
[(methylamide)(tetramethyl-$\eta^5$-cyclopentadienyl)-1,2-ethanediyl]dineopentyl titanium,
[(phenylphosphide)(tetramethyl-$\eta^5$-cyclopentadienyl)methylene]diphenyl titanium,
[dibenzyl(t-butylamide)(tetramethyl-$\eta^5$-cyclopentadienyl)silane]dibenzyl titanium,
[dimethyl(benzylamide)($\eta^5$-cyclopentadienyl)silane]di(trimethylsilyl)titanium,
[dimethyl(phenylphosphide)(tetramethyl-$\eta^5$-cyclopentadienyl)silane]dibenzyl titanium,

[(tetramethyl-$\eta^5$-cyclopentadienyl)-1,2-ethanediyl]dibenzyl titanium,
[2-$\eta^5$-(tetramethyl-cyclopentadienyl)-1-methylethanolate (2-)]dibenzyl titanium,
[2-$\eta^5$-(tetramethyl-cyclopentadienyl)-1-methylethanolate (2-)]dimethyl titanium,
[2-((4a,4b,8a,9,9a-$\eta$)-9H-fluorene-9-yl)cyclohexanolate (2-)]dimethyl titanium, and
[2-((4a,4b,8a,9,9a-$\eta$)-9H-fluorene-9-yl)cyclohexanolate (2-)]dibenzyl titanium.

Further, compounds obtainable by replacing titanium metal with zirconium metal or hafnium metal in the above compounds may be exemplified.

These metallocene compounds may be used singly or in combination with two or more.

In the present invention, as the metallocene compound of the formula (i), it is preferred to use zirconocene compounds where the center metal atom is zirconium and at least two ligands having a cyclopentadienyl skeleton are contained.

As the metallocene compounds of the formula (ii) or (iii), the center metal atom is preferably titanium. Among the above metallocene compounds, the compounds of the formula (iii) where the center metal atom is titanium are particularly preferred.

The organoaluminum oxy compounds forming the metallocene catalyst may be conventionally known aluminoxane or organoaluminum oxy compounds insoluble in benzene.

The ionized ionic compounds forming the metallocene catalyst may include Lewis acid, ionic compounds, etc.

Examples of Lewis acid are compounds represented by $BR_3$ where R is fluorine or a phenyl group optionally having a substituent such as fluorine, a methyl group or trifluoromethyl group, and may include trifluoroboron, triphenyl boron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of the ionic compounds may include trialkyl substituted ammonium salt, N,N-dialkyl anilinium salt, dialkyl ammonium salt, triaryl phosphonium salt, etc.

Specific examples of trialkyl substituted ammonium salt may include:
triethyl ammonium tetra(phenyl)boron,
tripropyl ammonium tetra(phenyl)boron,
tri(n-butyl)ammonium tetra(phenyl)boron,
trimethyl ammonium tetra(p-tolyl)boron,
trimethyl ammonium tetra(o-tolyl)boron,
tributyl ammonium tetra(pentafluorophenyl)boron,
tripropyl ammonium tetra(o,p-dimethylphenyl)boron,
tributyl ammonium tetra(m,m-dimethylphenyl)boron,
tributyl ammonium tetra(p-trifluoromethylphenyl)boron and
tri(n-butyl) ammonium tetra(o-tolyl)boron.

Examples of N,N-dialkyl anilinium salt may include:
N,N-dimethyl anilinium tetra(phenyl)boron,
N,N-diethyl anilinium tetra(phenyl)boron and
N,N-2,4,6-pentamethyl anilinium tetra(phenyl)boron.

Examples of the dialkyl ammonium salt may include:
di(1-propyl)ammonium tetra(pentafluorophenyl)boron and
dicyclohexyl ammonium tetra(phenyl)boron.

Further examples of the ionic compounds may include:
triphenyl carbenium tetrakis(pentafluorophenyl)borate,
N,N-dimethyl anilinium tetrakis(pentafluorophenyl)borate and ferrocenium tetra(pentafluorophenyl)borate.

In forming the metallocene catalyst, an organoaluminum compound may be used together with the organoaluminum oxy compound and/or the ionized ionic compound.

Examples of the organoaluminum compound may include:
trialkyl aluminums such as trimethyl aluminum, triethyl aluminum and triisobutyl aluminum;
dialkyl aluminum halides such as dimethyl aluminum chloride, diethyl aluminum chloride and diisobutyl aluminum chloride;
alkylaluminum sesquihalides such as methylaluminum sesquichloride, ethylaluminum sesquichloride and butylaluminum sesquichloride;
alkylaluminum dihalides such as methylaluminum dichloride and ethylaluminum dichloride;
dialkyl aluminum hydrides such as diethylaluminum hydride and dibutylaluminum hydride; and
alkylaluminum dihydrides such as ethylaluminum dihydride and propylaluminum dihydride.

In the present invention, ethylene, an $\alpha$-olefin of 3 to 20 carbon atoms and the above silicon-containing ethylene monomer are generally copolymerized in the presence of the above metallocene catalyst in a liquid phase. In this copolymerization, a hydrocarbon solvent is generally used as a polymerization solvent, and further an $\alpha$-olefin such as propylene may be used.

Examples of the hydrocarbon solvent used in the polymerization are:
aliphatic hydrocarbons and halogen derivatives thereof such as pentane, hexane, heptane, octane, decane, dodecane and kerosene;
alicyclic hydrocarbons and halogen derivatives thereof such as cyclohexane, methylcyclopentane and methylcyclohexane;
aromatic hydrocarbons such as benzene, toluene and xylene; and
halogen derivatives thereof such as chlorobenzene and the like.

These solvents may be used singly or in combination with two or more.

Ethylene, an $\alpha$-olefin of 3 to 20 carbon atoms and the above silicon-containing ethylene monomer can be copolymerized by any of batch-wise, continuous methods. The copolymerization is preferably carried out by the continuous method, particularly preferably by the continuous method using a mixing vessel type reactor. In carrying out the copolymerization with the continuous method, the catalyst is used in a concentration as follows.

In the case of using the metallocene catalyst as a catalyst, the concentration of the metallocene catalyst in the polymerization system is generally from 0.00005 to 0.1 mmol/L (polymerization volume), preferably 0.0001 to 0.05 mmol/L. The organoaluminum oxy compound is fed in an amount such that the molar ratio of aluminum atom to transition metal contained in the metallocene compound in the polymerization system (Al/transition metal) is from 1 to 10000, preferably 10 to 5000.

The ionized ionic compound is fed in an amount such that the molar ratio of ionized ionic compound to metallocene compound in the polymerization system (ionized ionic compound/metallocene compound) is from 0.5 to 30, preferably 1 to 25.

In the case of using the organoaluminum compound, it is used in an amount of usually about from 0 to 5 mmol/L (polymerization volume), preferably about 0 to 2 mmol/L.

In the case of copolymerizing ethylene, an $\alpha$-olefin of 3 to 20 carbon atoms and the above silicon-containing ethylene monomer in the presence of the metallocene catalyst, the copolymerization reaction is generally carried out under such conditions that the temperature is from −20° C. to 150°

C., preferably 0° C. to 120° C., more preferably 0° C. to 100° C., the pressure is over 0 kg/cm² and not more than 80 kg/cm², preferably over 0 kg/cm² and not more than 50 kg/cm². The polymerization conditions are preferably constant in the continuous method.

The reaction time (average residence time when the copolymerization is carried out by the continuous method) varies in accordance with the conditions such as catalyst concentration, polymerization temperature and the like. The reaction time is usually from 5 min to 5 hr, preferably 10 min to 3 hr.

Ethylene, an α-olefin of 3 to 20 carbon atoms and the above silicon-containing ethylene monomer are fed to the polymerization system in an amount such that the silicon-containing olefin copolymer having the specific composition as described above is obtained. Additionally, in the copolymerization, a molecular weight modifier such as hydrogen and the like can be also used.

When ethylene, an α-olefin of 3 to 20 carbon atoms and the above silicon-containing ethylene monomer are copolymerized in the above manner, the silicon-containing olefin copolymer is usually prepared in a polymerization liquid mixture containing the copolymer. The polymerization liquid mixture is treated in the usual way and thereby the cross-linkable silicon-containing olefin copolymer according to the present invention can be prepared.

Next, the Ziegler catalyst containing a vanadium compound and an organoaluminum compound as essential components is described.

The vanadium compound of the Ziegler catalyst containing a vanadium compound and an organoaluminum compound as essential components is a soluble vanadium compound represented by $VO(OR)_nX_{3-n}$ in which R is a hydrocarbon group, X is a halogen atom and n is an integer of 0 to 3, or a vanadium compound represented by $VX_4$ in which X is a halogen atom. Examples thereof may include vanadium compounds represented by $VO(OR)_aX_b$ or $V(OR)_cX_d$ in which R is a hydrocarbon group, $0 \leq a \leq 3$, $0 \leq b \leq 3$, $2 \leq a+b \leq 3$, $0 \leq c \leq 4$, $0 \leq d \leq 4$, $3 \leq c+d \leq 4$, and adducts of electron donors of these vanadium compounds.

Specific examples thereof may include $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_3$, $VCl_4$, $VOCl_3$, $VO(O\text{-n-}C_4H_9)_3$, $VCl_3 \cdot 2OC_6H_{12}OH$, etc.

The organoaluminum compound may include organoaluminum compounds represented by $R'_mAlX'_{3-m}$ in which R' is a hydrocarbon group, X' is a halogen atom and m is an integer of 1 to 3. Examples of the organoaluminum compound may include:

trialkyl aluminums such as triethyl aluminum and tributyl aluminum and the like;

dialkyl aluminum alkoxides such as diethyl aluminum ethoxide and the like;

alkyl aluminum sesquialkoxides such as ethyl aluminum sesquiethoxide and the like;

dialkyl aluminum halides such as diethyl aluminum chloride and the like; and partially halogenated alkyl aluminums, for example, alkyl aluminum sesquihalides such as ethyl aluminum sesquichloride and the like, and alkyl aluminum dihalides such as ethyl aluminum dichloride and the like.

The silicon-containing olefin copolymer of the present invention is obtainable by randomly copolymerizing ethylene, an α-olefin of 3 to 20 carbon atoms and the above silicon-containing ethylene monomer at a polymerization temperature of from 30 to 60° C., especially 30 to 59° C., at a polymerization pressure of from 4 to 12 kgf/cm², especially 5 to 8 kgf/cm², in the presence of the Ziegler catalyst containing the above vanadium compound and the organoaluminum compound as essential components. The copolymerization is preferably carried out in a hydrocarbon medium (for example, the hydrocarbon solvent same as those as described in the metallocene catalyst).

The silicon-containing olefin copolymer of the present invention, further, may be graft-modified with a polar monomer, for example, an unsaturated carboxylic acid or derivative thereof (for example, acid anhydride or ester).

Examples of the unsaturated carboxylic acid may include an acrylic acid and methacrylic acid.

Examples of the acid anhydride of the unsaturated carboxylic acid may include maleic anhydride, etc.

Preferable example of the unsaturated carboxylic acid ester may include methyl acrylate, ethyl acrylate, etc. The graft modifiers (graft monomers) of the unsaturated carboxylic acid, etc may be used singly or in combination with two or more. In any cases, the graft amount is preferably not more than 0.1 mol based on 100 g of the silicon-containing olefin copolymer before the graft modification.

The use of the silicon-containing olefin copolymer having a graft amount in the above range can prepare a rubber composition having excellent fluidity (molding processability) and capable of preparing a cross-linked rubber molded article having excellent cold resistance.

The graft modified silicon-containing olefin copolymer can be prepared by allowing the unmodified silicon-containing olefin copolymer as described above to react with an unsaturated carboxylic acid or its derivative in the presence of a radical initiator.

The graft reaction may be carried out in a solution state or in a molten state. In the case of carrying out the graft reaction in a molten state, it is most efficient and preferable to conduct the graft reaction in an extruder continuously.

Additionally the following non-conjugated polyene can be copolymerized as long as the aimed physical properties of the present invention are not marred, for example the branching index is not less than 0.70. For example, the copolymerization with 5-vinyl-2-norbornene, or a diene such as norbornadiene, 1,7-octadiene and 1,8-nonadiene can decrease the branching index.

Examples of the non-conjugated polyene may include:

cyclic dienes such as 5-methylene-2-norbornene, 5-vinyl-2-norbornene, 5-(2-propenyl)-2-norbornene and 5-(3-butenyl)-2-norbornene;

chainlike non-conjugated dienes such as 1,4-hexadiene and 7-methyl-1,6-octadiene;

cyclic non-conjugated dienes such as 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and cyclic trienes such as 2,3-diisopropylidene-5-norbornene and the like. These polyene compounds may be used singly or in combination with two or more. The copolymerization with, for example, 5-vinyl-2-norbornene or dienes such as norbornadiene, 1,7-octadiene and 1,8-nonadiene can decrease the branching index in the range of not less than 0.70.

Cross-Linkable Rubber Composition

The cross-linkable rubber composition of the present invention is a curing composition and may be blended with a catalyst (B) which accelerates the hydrolysis, in addition to the above silicon-containing olefin copolymer (component (A)), and further, may optionally contain a stabilizer (C), a reinforcing agent (D) and a plasticizer (E).

Catalyst (B)

The catalyst (B) used in the present invention is not particularly limited as long as it accelerates the hydrolysis. Examples thereof may include:

titanic acid esters such as tetrabutyl titanate and tetrapropyl titanate;

tin carboxylic acid salts such as dibutyl tin dioctoate, dibutyl tin dilaurate, dibutyl tin maleate, dibutyl tin diacetate, tin octylic acid and tin naphthenic acid;

a reaction product of dibutyl tin oxide and phthalic acid ester;

dibutyl tin diacetylacetonate;

organoaluminum compounds such as aluminum trisacetylacetonate, aluminum trisethylacetoacetate and diisopropoxy aluminum ethylacetoacetate;

xylate compounds such as zirconium tetraacetylacetonate and titanium tetraacetylacetonate;

lead octylate;

amine compounds such as butyl amine, octyl amine, lauryl amine, dibutyl amine, monoethanol amine, diethanol amine, triethanol amine, diethylene triamine, triethylene tetramine, oleyl amine, cyclohexyl amine, benzyl amine, diethyl aminopropyl amine, xylylene diamine, triethylene diamine, guanidine, diphenyl guanidiene, 2,4,6-tris(dimethyl aminomethyl)phenol, morpholine, N-methyl morpholine, 2-ethyl-4-methyl imidazole and 1,8-diazabicyclo[5.4.0]undecene-7(DBU); or salts of these amine compounds with a carboxylic acid;

low molecular weight polyamide resins obtainable by excess polyamine and a poly basic acid;

reaction products of excess polyamine and an epoxy compound;

silanol condensation catalysts, e.g. amino group-containing silane coupling agents such as γ-aminopropyl trimethoxy silane and N-(β-aminoethyl)aminopropyl methyl dimethoxy silane; and known silanol condensation catalysts such as other acid catalysts and basic catalysts.

These catalysts (B) may be used singly or in combination with two or more.

Of these catalysts (B), the titanium catalysts and the tin catalysts are preferred from the viewpoint of easiness of availability, cost and properties. For example, there are #918 manufactured by Sankyo Organic Chemicals Co., Ltd and the like.

These catalysts (B) are used in an amount of preferably about from 0.1 to 20 parts by weight, more preferably 1 to 10 parts by weight based on 100 parts by weight of the silicon-containing olefin copolymer (A). When the amount of the catalyst (B) is too small based on the silicon-containing olefin copolymer (A), the curing rate is occasionally slow and the curing reaction does not proceed sufficiently. On the other hand, when the amount of the catalyst (B) is too large based on the silicon-containing olefin copolymer (A), local exothermic reaction or bubble forming are induced in curing and good cured products are hardly prepared. Therefore, the use of the large amount of the catalyst (B) is unfavorable.

Stabilizer (C)

Examples of the stabilizer(C) optionally used in the present invention may include a heat stabilizer, weathering stabilizer and hindered amine stabilizer.

Examples of the heat stabilizer optionally used in the present invention may include a phenol stabilizer, phosphorus stabilizer and sulfur stabilizer.

As the phenol stabilizer, phenol stabilizers conventionally used as a stabilizer can be used without limitation.

Examples of the phenol stabilizer may include

β-(3,5-di-t-butyl-4-hydroxyphenyl)propionic acid stearyl ester, tetrakis[methylene-3-(3,5-di-t-butyl-4-hydroxyphenyl)propionate]methane, tris(3,5-di-t-butyl-4-hydroxybenzyl)isocyanurate, 1,3,5-trimethyl-2,4,6-tris(3,5-di-t-butyl-t-hydroxybenzyl)benzene, dl-α-tocopherol, tris(2,6-dimethyl-3-hydroxy-4-t-butylbenzyl)isocyanurate, tris[(3,5-di-t-butyl-4-hydroxyphenyl)propionyloxy ethyl]isocyanurate, and 3,9-bis[1,1-dimethyl-2-{β-(3-t-butyl-4-hydroxy-5-methyl phenyl)propionyloxy}ethyl]-2,4,8,10-tetraoxaspiro[5.5]undecane.

As the phenol stabilizer, commercially available ones can be used. Examples thereof are:

Irganox 1010 (Trade Mark, Ciba-Geigy Co.),

Irganox 1076 (Trade Mark, Ciba-Geigy Co.),

Irganox 1330 (Trade Mark, Ciba-Geigy Co.),

Irganox 3114 (Trade Mark, Ciba-Geigy Co.),

Irganox 3125 (Trade Mark, Ciba-Geigy Co.),

BHT (Trade Mark, Takeda Chemical Industries Ltd.),

Cyanox 1790 (Trade Mark Cyanamide Co., Ltd.),

Sumilizer GA-80 (Trade Mark Sumitomo Chemicals Co., Ltd.), and Vitamin E (Eisai Co., Ltd). These phenol stabilizers may be used singly or in combination.

The phenol stabilizer is used from 0.01 to 20 parts by weight, preferably 0.05 to 10 parts by weight, more preferably 0.1 to 3 parts by weight based on 100 parts by weight of the silicon-containing olefin copolymer (A). When the phenol stabilizer is used in the above amounts based on 100 parts by weight of the copolymer (A), the stabilities such as heat resistant and aging resistant are highly improved, and further the cost of the stabilizer is reduced and the properties of the copolymer (A) such as tensile strength and the like after a heat aging test do not lower.

As the phosphorus stabilizers, posphorus stabilizers conventionally used as a stabilizer are used without particular limitation. Examples of the phosphorus stabilizers may include conventionally available ones, such as Irgafos 168 (Trade Mark, Ciba-Geigy Co.), Irgafos 12 (Trade Mark, Ciba-Geigy Co.), Irgafos 38 (Trade Mark, Ciba-Geigy Co.), Mark329K (Trade Mark, Asahi Denka Co., Ltd), Mark PEP 36 (Trade Mark, Asahi Denka Co., Ltd), Mark PEP 8 (Trade Mark, Asahi Denka Co., Ltd), Sandstab P-EPQ (Trade Mark, Clariant AG), Weston 618 (Trade Mark GE Co.), Weston 619 (Trade Mark, GE Co.) and Weston 624 (Trade Mark, GE Co.). These phosphorus stabilizers may be used singly or in combination.

The phosphorus stabilizer is used in an amount of from 0.01 to 20 parts by weight, preferably 0.05 to 10 parts by weight, more preferably 0.1 to 3 parts by weight based on 100 parts by weight of the copolymer (A). When the content of the phosphorus stabilizer is in the above range based on 100 parts by weight of the copolymer (A), the effect of improving the stabilities such as heat resistance and aging resistance is high, and further the cost of the stabilizer is reduced and the properties of the copolymer (A) such as tensile strength and the like after a heat aging test do not lower.

As the sulfur stabilizer, sulfur stabilizers conventionally used as a stabilizer are used without particular limitation. Specifically, the sulfur stabilizer may include dilauryl-, dimyristyl-, distearyl- and other dialkyl-thiodipropionates, or esters of butyl-, octyl-, lauryl-, stearyl- and other alkyl thiopropionic acid with polyvalent alcohols, for example, glycerin, trimethylolethane, trimethylolpropane, pentaerythritol and trishydroxyethylisocyanurate, such as pentaerythritol tetralauryl thiopropionate.

Examples of the sulfur stabilizers may include conventionally available ones, such as DSPT (Trade Mark Yoshitomi Pharmaceutical Industries Ltd.), DLTP (Trade Mark Yoshitomi Pharmaceutical Industries Ltd.), DLTOIB (Trade Mark Yoshitomi Pharmaceutical Industries Ltd.), DMTP (Trade Mark Yoshitomi Pharmaceutical Industries Ltd.), Seenox 412S (Cyanamid Co.) and Cyanox 1212 (Cyanamid Co.). These sulfur stabilizers may be used singly or in combination.

The sulfur stabilizer is used in an amount of from 0.01 to 20 parts by weight, preferably 0.05 to 10 parts by weight, more preferably 0.1 to 3 parts by weight based on 100 parts by weight of the copolymer (A). When the content of the sulfur stabilizer is in the above range based on 100 parts by weight of the copolymer (A), the effect of improving the stabilities such as heat resistance and aging resistance is high, and further the cost of the stabilizer is reduced and the properties of the copolymer (A) such as tensile strength and the like after a heat aging test do not lower.

The weathering stabilizers optionally used in the present invention are classified into an ultraviolet absorber and a light stabilizer.

Examples of the ultraviolet stabilizer may include a salicylic acid ultraviolet absorber, benzophenone ultraviolet absorber, benzotriazole ultraviolet absorber and cyanoacrylate ultraviolet absorber.

The ultraviolet absorber is used in an amount of from 0.01 to 20 parts by weight, preferably 0.05 to 10 parts by weight, more preferably 0.1 to 3 parts by weight based on 100 parts by weight of the copolymer (A).

As the light stabilizer, conventionally known light stabilizers can be used, and hindered amine light stabilizers (HALS) are preferably used among them.

Examples of the hindered amine light stabilizers are the following compounds:
(1) bis(2,2,6,6-tetramethyl-4-piperidyl)sebacate,
(2) dimethyl succinate-1-(2-hydroxyethyl)-4-hydroxy-2,2,6,6-tetramethyl pyperidine polycondensate,
(3) poly{[6-(1,1,3,3-tetramethylbutyl)imino-1,3,5-triadine-2-4-diyl][(2,2,6,6-tetramethyl-4-pyperidyl)imino]hexamethylene[(2,2,6,6-tetramethyl-4-pyperidyl)imino]},
(4) tetrakis(2,2,6,6-tetramethyl-4-pyperidyl)-1,2,3,4-butane tetracarboxylate,
(5) 1,1'-(1,2-ethanediyl)bis(3,3,5,5-tetramethyl pyperadinone,
(6) mixed{2,2,6,6-tetramethyl-4-pyperidyl/β,β,β'β'-tetramethyl-3-9-[2,4,8,10-tetraoxaspiro(5.5)undecane]diethyl}-1,2,3,4-butane tetracarboxylate,
(7) poly{[6-N-morpholyl-1,3,5-triadine-2-4-diyl] [(2,2,6,6-tetramethyl-4-pyperidyl)imino]hexamethylene[(2,2,6,6-tetramethyl-4-pyperidyl)imidno]} and
(8) condensate of N,N'-bis(2,2,6,6-tetramethyl-4-pyperidyl) hexamethylene diamine and 1,2-dibromoethane.

These hindered amine light stabilizers may be used singly or in combination.

The hindered amine light stabilizer is used in an amount of from 0.01 to 20 parts by weight, preferably 0.05 to 10 parts by weight, more preferably 0.1 to 3 parts by weight based on 100 parts by weight of the copolymer (A). When the content of the hindered amine light stabilizer is in the above range based on 100 parts by weight of the copolymer (A), the effect of improving the stabilities such as heat resistance and aging resistance is high, and further the cost of the light stabilizer is reduced and the properties of the copolymer (A) such as tensile strength and the like after a weathering resistant test do not lower.

Reinforcing Agent (D)

The reinforcing agent optionally used in the present invention has an effect of enhancing the mechanical properties of a cross-linked product such as tensile strength, tear strength and abrasion resistance. Examples of the reinforcing agent mayincludecarbonblackssuchas SRF, GPF, FEF, HAF, ISAF, SAF, FT, and MT; surface-treated carbon blacks with a silane coupling agent, etc; fine powdery silicic acid and silica.

Specific examples of silica may include fumed silica, precipitated silica, etc. These silicas may be surface-treated with a reactive silane such as hexamethyl disilazane, chlorosilane, alkoxy silane, etc. or low molecular weight siloxane. These silicas have a specific surface area as measured by BED method of preferably not less than 50 $m^2/g$, more preferably from 100 to 400 $m^2/g$.

The kind and the amount of these reinforcing agents (D) are appropriately selected in accordance with the use. The amount of the reinforcing agent (D) is at most 300 parts by weight, preferably at most 200 parts by weight based on 100 parts by weight of the copolymer (A).

Plasticizer (E)

The plasticizer (E) optionally used in the present invention is not particularly limited. Examples of the plasticizer may include phthalic acid esters such as dibutyl phthalate, diheptyl phthalate, di(2-ethylhexyl)phthalate, dioctyl phthalate, butyl benzyl phthalate and butyl phthalyl butyl glycolate;

non-aromatic dibasic acid esters such as dioctyl adipate and dioctyl sebacate;

polyalkylene glycol esters such as diethylene glycol dibenzoate and triethylene glycol dibenzoate;

phosphoric acid esters such as tricresyl phosphate and tributyl phosphate;

chlorinated paraffins; and hydrocarbon oils such as alkyldiphenyl, polybutene, hydrogenatedpolybutene, ethylene-α-olefinoligomer, α-methyl styrene oilgomer, biphenyl, triphenyl, triaryl dimethane, alkylene triphenyl, liquid polybutadiene, hydrogenated liquid polybutadiene, paraffin oil, naphthene oil, atactic polypropylene and partially hydrogenated terphenyl. These plasticizers (E) may be used singly or in combination. These plasticizers (E) may be blended in preparing the copolymer (A).

Of these plasticizers (E), the hydrocarbon plasticizer is preferred because it is widely used and has a low cost and excellent weathering resistance.

Other Components

The cross-linkable rubber composition of the present invention may be optionally blended with various additives such as inorganic fillers, dehydrating agents, tackifiers, physical property regulators, storage stability improvers, antioxidants, metal inactivators, ozone deterioration inhibitors, amine radical chain inhibitors, phosphorus peroxide decomposing agents, lubricants, pigments and foaming agents.

Examples of the inorganic fillers may include precipitated calcium carbonate, heavy calcium carbonate, talc and clay.

The kind and the amount of these inorganic fillers are appropriately selected in accordance with the use. The amount of the inorganic filler is at most 300 parts by weight, preferably at most 200 parts by weight based on 100 parts by weight of the copolymer (A).

As the dehydrating agent, compounds capable of reaction with water are generally preferred, and particularly a hydrolyzable silicon compound is preferred. The hydrolyzable silicon compound is a general name for low molecular silicon compounds having a hydrolyzable functional group capable of reacting in the presence of moisture and, in general, it preferably has a molecular weight of not more than 300. Additionally, the hydrolyzable silicon compound may include other functional groups than the hydrolyzable functional group.

Examples of the hydrolyzable functional group may include alkoxyl group, acyloxy group, ketoxymate group, amino group, aminoxy group, amide group and alkenyloxy group. Examples of the other functional groups may include epoxy-containing groups, amino-containing groups, acryl-containing groups and mercapto-containing groups. These compounds are specifically described below:

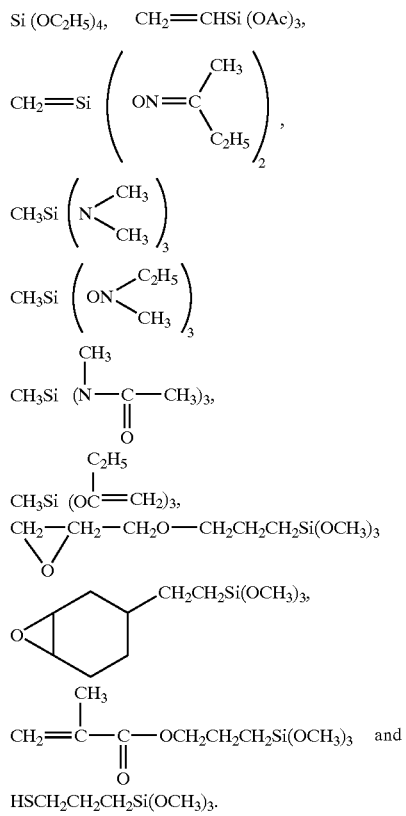

Further, it is also possible to use an aminosilane compound serving both as a tackifier and a dehydrating agent.

As the aminosilane compound, the amino group-substituted alkoxysilane or amino group-substituted alkoxy silane derivative compound is exemplified more specifically.

Examples thereof are amino group substituted alkoxysilanes such as

and

reactants of this amino group-substituted alkoxysilane and an epoxy silane compound such as

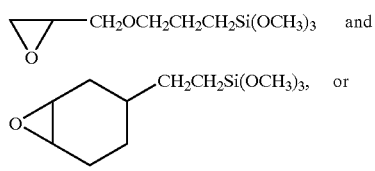

reactants of the above amino group-substituted alkoxy silane and an acryloyl silane compound such as

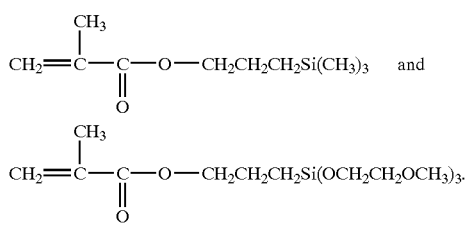

The reactants of the amino group-substituted alkoxysilane and the epoxy silane compound or the reactants of the amino group-substituted alkoxy silane and the acryloyl silane compound can be easily prepared by mixing 1 mol of the amino group-substituted alkoxy silane and 0.2 to 5 mol of the silane compound and stirring at a temperature of from room temperature to 180° C. for 1 to 8 hr.

The amino group-substituted alkoxy silane or the amino group-substituted alkoxy silane derivative compound is preferably used in an amount of from 0.01 to 20 parts by weight based on 100 parts by weight of the silicon-containing olefin copolymer (A).

As the adhesion improver, adhesives generally used, silane coupling agents such as aminosilane compounds and epoxy silane compounds, and other compounds are used. Examples of the adhesion improver may include phenol resin, epoxy resin, γ-aminopropyl trimethoxy silane, N-(β-aminoethyl)aminopropyl methyl dimethoxy silane, coumarone-indene resin, rosin ester resin, terpene-phenol resin, α-methylstyrene-vinyltoluene copolymer, polyethylmethylstyrene, alkyltitanates and aromatic polyisocyanate.

As the storage stability improver, compounds in which hydrolyzable group is bonded to a silicon atom, and ortho-organic acid esters are described.

Examples of the storage stability improver may include methyltrimethoxysilane, methyltriethoxysilane, tetramethoxysilane, ethyltrimethoxysilane, dimethyldiethoxysilane, trimethylisobutoxysilane, trimethyl(n-butoxy)silane, n-butyltrimethoxysilane and methyl ortho-formate.

Examples of the antioxidant may include known antioxidants generally used, such as sulfur antioxidant, radical inhibitor and ultraviolet absorber.

Examples of the sulfur antioxidant are mercaptans, salts of mercaptans, sulfides including sulfide carboxylates or hindered phenol sulfides, polysulfides, dithio carboxylic acid salts, thioureas, thiophosphates, sulfonium compounds, thioaldehydes, thioketones, mercaptals, mercaptoles, monothioic acids, polythioic acids, thioamides and sulfoxides. Specific examples of sulfur antioxidant may include mercaptans such as 2-mercaptobenzothiazole, salts of mercaptans such as zinc salt of 2-mercatobenzothiazole sulfides such as 4,4'-thio-bis(3-methyl-6-t-butyl phenol), 4,4'-thio-bis(2-methyl-6-t-butyl phenol), polysulfides such as 2-benzothiazole disulfide, dithiocarboxylic acid salts such as zinc dibutyl dithiocarbamate, thioureas such as 1-butyl-3-oxy-diethylene-2-thiourea, thiophosphates such as trilauryl trithiophosphate.

When the sulfur antioxidants are used for the curing composition of the present invention, the decomposition deterioration in a main chain of the copolymer (A) caused by heat can be greatly prevented and the occurrence of surface tack (tackiness) can be prevented as compared with other antioxidants.

Examples of the radical inhibitor are phenol radical inhibitors such as 2,2-methylene-bis(4-methyl-6-t-butylphenol) and tetrakis[methylene-3-(3,5-di-t-butyl-4-hydroxyphenyl)propionate]methane, and amine radical inhibitors such as phenyl-β-naphthyl amine, α-naphthyl amine, N,N'-sec-butyl-p-phenylene diamine, phenothiadine and N,N'-diphenyl-p-phenylene diamine.

The ultraviolet absorbers are the same as those described in the stabilizer (C).

In addition to the above various additives, the cross-linkable rubber composition of the present invention may be further blended with additives such as rubber reinforcing agent, softener, processing aid, vulcanization accelerator, organic peroxide, cross-linking assistant, foaming assistant, colorant, dispersant, flame retardant without missing the scope of the invention.

The rubber-reinforcing agent has an effect of enhancing mechanical properties of a cross-linking (vulcanizing) rubber such as tensile strength, tear strength and abrasion resistance. Examples of the rubber-reinforcing agent may include carbon blacks such as SRF, GPF, FEF, HAF, ISAF, SAF, FT and MT; surface-treated carbon blacks with a silane coupling agent; fine powdery silicic acid; and silica.

Specific examples of silica may include fumed silica, precipitated silica, etc. These silicas may be surface-treated with a reactive silane such as hexamethyl disilazane, chlorosilane, alkoxysilane, etc. or low molecular weight siloxane. The silica has a specific surface area as measured by BED method of preferably not less than 50 $m^2/g$, more preferably from 100 to 400 $m^2/g$.

The kind and the amount of these rubber-reinforcing agents are appropriately selected in accordance with the use. The amount of the rubber-reinforcing agent is at most 300 parts by weight, preferably at most 200 parts by weight based on 100 parts by weight of the copolymer (A).

As the softener, softeners generally used for rubbers can be used. Examples thereof are petroleum type softeners such as process oil and fluid paraffin; coal tar type softeners such as coal tar and the like; fatty oil type softeners such as castor oil and the like; tall oil; factice; waxes such as bee wax and the like; aliphatic acids and aliphatic acid salts such as ricinoleic acid, palmitic acid, barium stearate, calcium stearate and zinc laurate; and synthetic polymers such as petroleum resin, atactic polypropylene and cumarone-indene resin. Of these, the petroleum type softeners are preferably used and process oil is preferably used in particular.

The amount of these softeners is appropriately selected in accordance with the use of a cross-linked product.

The composition of the present invention contains the silicon-containing olefin copolymer as described above.

To the composition of the present invention, the catalyst (B) may be added. That is, the composition is a cross-linkable composition comprising the silicon-containing olefin copolymer and the catalyst (B).

The composition of the present invention may be optionally blended with at least one of the stabilizer (C), the reinforcing agent (D) and the plasticizer (E).

[Process for Preparing Cross-Linkable Rubber Composition]

The process for preparing the cross-linkable rubber composition according to the present invention is not particularly limited, and may include, for example, a conventional process of blending the above components, kneading them at room temperature or under heating with a kneader or a process of dissolving the components by using a small amount of a suitable solvent and mixing.

That is to say, the cross-linkable rubber composition according to the present invention can be prepared by mixing the silicon-containing olefin copolymer (A) and the catalyst (B), and optionally in accordance with the use of the aimed cross-linked product, the stabilizer (C), the reinforcing agent (D), the plasticizer (E) and the above additives by means of mixers such as planetary mixer, etc. or kneading machines such as roll and kneader.

In the case of using as sealing materials, potting materials, coating materials or adhesives, the compounded rubber thus prepared has a viscosity, as measured at room temperature at 1 rpm by a B type viscometer, of not more than 10000 Pa·s, preferably not more than 5000 Pa·s, more preferably not more than 3000 Pa·s, further prepferably not more than 2000 Pa·s, still preferably not more than 1000 Pa·s. Additionally, one liquid type or two liquid type compounds prepared by combining the above components appropriately can be used as the compounded rubber.

In measuring the compounded rubber, for the one liquid type compound, the viscosity thereof is measured. In the case of the two liquid type compound, the two liquids are mixed and thereafter the viscosity can be measured. The measurement of the viscosity is preferably carried out within 10 min after introducing the catalyst.

The cross-linkable rubber composition thus prepared according to the present invention is filled in a gap, kneaded and pasted -between substances, applied on a substance for coating, potted into a substance or molded into a desired shape by an extrusion molding machine, calendar roll, press, injection molding machine or transfer molding machine with RIM (reaction injection) molding, LIM (liquid injection) molding, etc, and thereafter, allowed to stand at room temperature for proceeding the cross-linking reaction and thereby the aimed cross-linked product can be prepared. Further, heating may be applied to advance the cross-linking reaction.

When the cross-linkable rubber composition of the present invention is exposed to air, it forms a three-dimensional net structure by a function of moisture and cured into a solid having rubbery elasticity.

[Use of Cross-Linkable Rubber Composition]

The cross-linkable rubber composition of the present invention, as described above, is suitably used in various ways such as electric and electronic parts, transporting machines, civil engineering and constructions, medical treatment or leisure activities.

Examples of the use for the electric and electronic parts may include sealing materials, potting materials, coating materials or adhesives for circuits or substrates of heavy electrical apparatuses, light electrical appliances or electric and electronic appliances; repairing materials for covering electric wire; insulating sealing materials for electric wire joint parts; rolls for OA appliances; oscillation absorbers; and gels or sealing materials for condensers.

The above sealing materials are suitably used as sealing materials for refrigerators, freezers, washing machines, gas meters, microwave ovens, stream irons or circuit-breakers.

The potting materials are suitably used for potting trans high-voltage circuits, printed boards, high-voltage transformers with variable resistor, electric insulating parts, semiconductor parts, conductive parts, solar cells or fly back transformers for TV.

The coating materials are suitably used for coating circuit elements, such as a hybrid IC; HIC; electrical insulating parts; semi-conductive parts; conductive parts; modules; printed circuits; ceramic boards; buffer materials for diodes, transistors and bonding wires; semi-conductive elements; and optical fibers for optical communication.

The adhesives are suitably used for bonding cathode-ray tube wedges, electric insulating parts, semi-conductor parts or conductive parts.

The use of the transporting machines may include uses for automobiles, ships, airplanes or railway vehicles.

The use in the automobiles may include sealing materials for gaskets of automobile-engine, electric installation parts or oil filters; potting materials for igniter HIC or automobile hybrid IC; coating materials for automobile body, automobile window glass or engine control substrates; and adhesives for gaskets in oil pans or timing belt covers, moles, head lamp lens, sunroof seals or mirrors.

The use in the ships may include sealing materials for wiring and connection switching boxes, electric parts or electric wires; and adhesives for electric wires or glasses.

The use in the civil engineering and constructions may include sealants for building materials, for example, butt joints in the glass screen method of business building construction, joints of glass borders with sash, joints for interior decorations in toilet, lavatory, or showcases, joint for bathtub borders, stretching joints for outside wall of prefabricated houses and joints for sizing boards; sealing materials for plural layered glass; civil engineering sealants used for repairing roads; paints and adhesives for metals, glasses, stone materials, slates, concrete or tiles; and adhesive sheets, waterproof sheets or vibration proof sheets.

The use in the medical treatment may include rubber stopper for medicine, syringe gaskets or rubber corks for pressure reducing blood vessel.

The use in the leisure activities may include swimming good materials such as swimming caps, diving masks and stopples; and gel buffering part materials used for sports shoes, baseball gloves and the like.

Of these uses, the rubber composition is preferably used for sealing materials or civil engineering and constructions, particularly sealants for civil engineering and constructions. In the uses, partial breakage caused by the vibration of drive way or wind is occurred with less frequency.

Further, for the uses of electric and electronic parts, transporting machines, civil engineering and constructions, medical treatment or leisure activities, for example, sealing materials, potting materials, coating materials, adhesive, etc, the silicon-containing olefin copolymer (A) preferably has a branching index of not less than 0.70, more preferably in the above-described range from the viewpoint of dynamic fatigue resistance.

Particularly, in the uses of sealing or civil engineering and constructions, it is one preferred embodiment that the silicon-containing olefin copolymer (A) has a branching index of not less than 0.70, for example, from 0.8 to 1. The preferable range of the branching index is the same as described above.

The silicon-containing olefin copolymer of the present invention can be applied to not only a two component type room temperature cross-linkable rubber but also a one component type room temperature cross-linkable rubber, and is used for uses such as elastic sealing agents and adhesives and further can be applied to a cross-linking type resin modifier by mixing with other polyolefins. Particularly, it is preferred to use as a toner modifier, especially a color toner modifier.

To produce a cross-linked article from the cross-linkable rubber composition according to the present invention, in similar to general room temperature cross-linkable rubbers (RTV rubber), the silicon-containing olefin copolymer (A), the catalyst (B), and optionally in accordance with an aimed cross-linked product, the stabilizer (C), the reinforcing agent (D), the plasticizer (E), the inorganic filler and other additives are mixed and then the compounded rubber is molded into an aimed shape (for example, it is filled between gaps, pasted into the gap between substrates, applied on a substrate for coating or potted on a substrate). Thereafter, the molded article is allowed to stand at room temperature to perform cross-linking (vulcanization). Further, heating may be applied in order to accelerate the cross-linking reaction. Further, molding may be conducted by RIM (reaction injection method) or LIM (liquid injection method). The RIM or LIM molding exhibits the effect in particular.

EXAMPLES

Hereinafter, the present invention will be described with reference to the following non-limiting examples.

With regard to the copolymers used in the examples and comparative examples, the composition, iodine value, intrinsic viscosity [η], branching index and molecular weight distribution (Mw/Mn) are measured or determined by the following methods.

(1) Composition of Copolymer Rubber

The composition of a copolymer rubber was measured by the $^{13}$C-NMR method.

(2) Iodine Value of Copolymer Rubber

The iodine value of a copolymer rubber was determined by the titration method.

(3) Intrinsic Viscosity [η]

The intrinsic viscosity [η] of a copolymer rubber was measured in decalin at 135° C.

(4) Branching Index

The branching index is an average branching index (BI) and was determined from several values obtained from the following three experiments.

(i) Weight average molecular weight ($Mw_{LALLS}$) measured using the low angle light scattering method (LALLS) after gel permeation chromatography (GPC).

The weight average molecular weight was measured using a LALLS detector connected to a GPC apparatus.

[Measuring Conditions]
Appratus: Waters 150 C
Detector: Chromatix KMX-6
Column: Shodex UT-806M (30 cm×2 columns), UT-807 (30 cm×1 column)
Solvent: 1,2,4-trichlorobenzene
Temperature: 135° C.
Flow rate: 0.764 ml/min
Concentration: 0.03 to 0.07% (w/v)
Injected amount: 300 µl (ii) Weight average molecular weight ($Mw_{DRI}$) and viscosity average molecular weight ($Mv_{DRI}$) measured using a differential refractive index detector connected to a GPC apparatus.

[Measuring Conditions]
Appratus: Waters 150 C
Detector: DRI (150 C buit-in)
Column: Shodex UT-806MLT (50 cm×1 column)
Solvent: 1,2,4-trichlorobenzene
Temperature: 135° C.
Flow rate: 1 ml/min
Concentration: 0.2% (w/v)
Injected amount: 160 µl Each of the average molecular weights was determined in terms of the value of EPDM. The viscosity formula used for the conversion is as follows.

Intrinsic viscosity $[\eta]=2.92 \times 10^{-4} Mw^{0.726}$ (iii) Intrinsic Viscosity (IV) (=[η]) as measured in decalin at 135° C.

The viscosity at each of four concentration adjustment points was measured with the multipoint method using an Ubbellohde viscometer and the relation of each of the measuring points was extrapolated to zero concentration.

The above measuring values (i) and (ii) were determined with GPC using a diluted 1,2,4-trichlorobenzene solution from which a polymer was filtered off.

The average branching index (BI) is defined by the following formula.

$$BI=(Mv_{br} \times Mw_{DRI})/(Mw_{LALLS} \times Mv_{DRI})$$

In the formula, $Mv_{br}=k(IV)^{1/a}$, $Mv_{br}$ is a viscosity average molecular weight of a branched polymer, a is a Mark-Houwink constant (ethylene/α-olefin/non-conjugated polyene copolymer has a value, as measured at 135° C. in decalin, of 0.759).

(5) Molecular Weight Distribution (Mw/Mn)

The molecular weight distribution of a copolymer rubber was represented by a ratio (Mw/Mn) of a weight average molecular weight (Mw) to a number average molecular weight (Mn), as determined with GPC. In the GPC, GMH-HT and GMH-HTL manufactured by Tosoh Coporation were used as a column and ortho-dichlorobenzene was used as a solvent.

Production Example 1

[Synthesis of Silicon-Containing Ethylene/Propylene Random Copolymer Rubber (A-1)]

A 2 L internal volume separable glass flask equipped with a stirrer was thoroughly purged with nitrogen, and to the flask, 1450 ml of impurity-removed hexane and 0.375 ml of 1-methyl dimethoxysilyl-ethylnorbornene (=(bicyclo [2.2.1]-5-ene-2-yl)dimethoxyethylsilane) were fed at 23° C. Successively, 6 ml of a diluted hexane solution of 12 mmol of ethyl aluminum sesquichloride was fed. Thereafter, this glass separable flask was heated in a stream of nitrogen. When the temperature reached to 40° C., the stream of nitrogen was stopped, and then hydrogen, ethylene and propylene were passed through, in an amount of 10 NL/hr, 85 NL/hr and 65 NL/hr respectively.

Subsequently, 24 ml of a hexane solution of 1.2 mmol of $VO(OC_2H_5)Cl_2$ was introduced into the flask over 2 sec from a dropping funnel and polymerization was carried out at 40° C. for 10 min. Thereafter, 5 g of methanol was introduced into the separable glass flask to stop the polymerization.

The resulting polymerization solution was introduced into 200 ml of methanol and was stirred for 5 min, and then was allowed to stand for 60 min. Subsequently, the solid component present in the bottom of the flask and the green solution were separated. Thereafter, the polymerization solution was introduced into 2000 ml of acetone to prepare a polymer containing the solvent.

Subsequently, the solvent containing polymer was dried under reduced pressure at 130° C. for 8 hr at a 600 mmHg and thereby 4.5 g of a silicon-containing ethylene/propylene random copolymer rubber (A-1) was obtained.

The copolymer rubber (A-1) had an intrinsic viscosity [η] of 0.5 dl/g, a molar ratio of ethylene to propylene of 68/32, a branching index of 0.98, a Mw/Mn of 3 and a content of an ethylene monomer having a silicon-containing group of 0.3 mol % (silicon content 0.3 mol %).

Subsequently, to 100 g of the copolymer rubber (A-1), 100 g of a plasticizer [Trade Mark PW-32 manufactured by Idemitsu Kosan Co., Ltd] was added and completely dissolved with mixing at 80° C. for 3 hr to prepare a copolymer (B-1). The silicon content of the silicon-containing copolymer (B-1) was measured and found to be 0.3 mol %.

Preparation Example 2

[Synthesis of Silyl Group-Containing Ethylene/Propylene/5-vinyl-2-norbornene Random Copolymer Rubber (A-2)]

Continuous terpolymerization of ethylene, propylene and 5-vinyl-2-norbornene was carried out using a 100 L internal volume stainless steel polymerization reactor equipped with a stirrer blade (rotation speed=250 rpm). From the side inlet of the polymerization reactor into a liquid phase, 60 L/hr of hexane, 3.0 Kg/hr of ethylene, 9.0 Kg/hr of propylene, 550g/hr of 5-vinyl-2-norbornene, and further 60 L/hr of hydrogen, and as a catalyst, 95 mmol/hr of $VOCl_3$, 443 mmol/hr of $Al(Et)_2Cl$ and 127 mmol of $Al(Et)_{1.5}Cl_{1.5}$ were fed continuously.

Carrying out the terpolymerization reaction in the conditions as described above, an ethylene/propylene/5-vinyl-2- norbornene random copolymer rubber (A-2) was obtained in a homogeneous solution state.

Thereafter, to the polymerization solution continuously drawn out from the lower part of the polymerization reactor, a small amount of methanol was added to stop the polymerization reaction. After the polymer was separated from a solvent with a steam stripping, the polymer was dried in vacuo at 55° C. for 48 hr.

Consequently, a copolymer rubber (A-2) having a molar ratio of ethylene to propylene of 68/32, an intrinsic viscosity [η] of 0.5 dl/g, an iodine value of 10 g/100 g, a branching index of 0.7, a Mw/Mn of 20 was obtained in an amount of 4.5 Kg/h.

To 100 g of the copolymer rubber (A-2), 100 g of a plasticizer [Trande Mark PW-32 manufactured by Idemitsu Kosan Co., Ltd] was added and completely dissolved with mixing at 80° C. for 3 hr. Thereafter, the temperature was returned to room temperature, 0.07 g of a catalyst [platinum-divinyltetramethyldisiloxane complex, Trade Mark SIP6832.0 manufactured by GELEST. Inc.: vinyl end group containing polydimethylsiloxane solution having a 3% platinum concentration] and 1.5 g of dimethoxymethylsilane [Trade Mark TSL8117 manufactured by GE Toshiba silicon Co., Ltd.] were fed and reacted at 120° C. for 2 hr. After the reaction, the silicon content of the silyl group modified copolymer rubber (B-2) was measured and found to be 0.3 mol %. This means the fact that in the silyl group modified copolymer rubber (B-2), 0.3 mol % of the structure derived from 5-vinyl-2-norbornene constituent units modified with silyl group was contained based on 100 mol % of the total of the constituent units of the rubber (B-2).

Example 1

Firstly, 200 parts by weight of the silicon-containing ethylene/propylene random copolymer rubber (B-1) prepared in Preparation Example 1, 100 parts by weight of calcium carbonate [Trade Mark KALFAIN 200 manufactured by Maruo Calcium Co., Ltd.], 60 parts by weight of a plasticizer [Trade mark PW-32 manufacture by Idemitsu Kosan Co., Ltd.], 2 parts by weight of a dehydrating agent [Trade Name A-171 manufactured by Nippon Unicar Co., Ltd.], 2 parts by weight of an adhesive [Trade Mark A-1100 manufactured by Nippon Unicar Co., Ltd.], 1 part by weight of an antioxidant [Trade Name Irganox 1010 manufactured by Ciba-Geigy Co., 1 part by weight of an ultraviolet absorber [Trade Mark Tinubin 327 manufactured by Ciba-Geigy Co.] and 1 part by weight of a weathering stabilizer [Trade Mark Sanol LS770 manufactured by Sankyo Lifetech. Co., Ltd.] were kneaded at 120° C. in vacuo by means of a planetary mixer [manufactured by INOUE MFG. CO.] to prepared a compounded rubber (C-1).

The resulting compounded rubber (C-1) was kneaded with 2 parts by weight of a catalyst [Trade Mark #918 manufactured by Sankyo Chemicals Inc.] by a planetary mixer [manufactured by INOUE MFG. CO.] at room temperature in vacuo to prepare a compounded rubber (D-1).

Using the resulting compounded rubber, the viscosity of the compounded rubber was measured in accordance with JIS K7117 (1997). The results are shown in Table 1. The compounded rubber had a viscosity, as measured with a B type viscometer at 0.01 rpm, of 8,000,000 cPs, and a viscosity as measured at 1 rpm of 265 Pa·s.

Using the compounded rubber, a tensile test piece was prepared and subjected to a tensile test in accordance with JIS A1439(1997). Further, it was subjected to de Mattia flexing fatigue test in accordance with JIS K-6260(1999). The de Mattia flexing fatigue test is an index of life of products toward external vibration, for example, sealing materials. These results are shown in Table 1.

(1) Tensile Test

The tensile test was carried out at a measuring temperature of 23° C. at a tensile rate of 500 mm/min in accordance with JIS K6251, and the break strength TB and the elongation at break EB of cross-linked sheet were measured.

(2) de Mattia Flexing Fatigue Test

The de Mattia flexing fatigue test was carried out in accordance with JIS-K-6260 (1999) and the number of flexings until a crack was grown to 15 mm was measured.

Comparative Example 1

The procedure of Example 1 was repeated except that in place of the copolymer rubber (B-1), the silyl group containing ethylene/propylene/5-vinyl-2-norbornene random copolymer rubber (B-2) prepared in Preparation Example 2 was used. The results are shown in Table 1. In this case, the copolymer rubber (B-2) had a branching index of 0.65.

Using a resulting compounded rubber, the viscosity of the compounded rubber was measured in accordance with JIS K7117(1997) in the same manner as in Example 1. The results are shown in Table 1. The compounded rubber had a viscosity, as measured with a B type viscometer at 0.01 rpm, of 13,500,000 cPs, and a viscosity as measured at 1 rpm of 330 Pa·s.

TABLE 1

| Silyl group-containing copolymer rubber | Example 1 (B-1) | Comparative Example 1 (B-2) |
|---|---|---|
| Properties of Silyl group-containing copolymer rubber | | |
| Ethylene/α-olefin (molar ratio) | 68/32 | 68/32 |
| Kind of α-olefin | propylene | propylene |
| Silicon content (mol %) | 0.3 | 0.3 |
| Iodine value (g/100 g) | 0.7 | 10 |
| [η] (dl/g) | 0.5 | 0.5 |
| Mw/Mn | 3 | 20 |
| Branching Idex | 0.98 | 0.65 |
| Amount of oil extension (phr) | 100 | 100 |
| 33800/Mn | 1.33 | 7.98 |
| Composition of Compound (part by weight) | | |
| Copolymer (each as described above) | 200 | 200 |
| Calcium carbonate | 100 | 100 |
| Plasticizer | 60 | 60 |
| Dehydrating agent | 2 | 2 |
| Adhesive | 2 | 2 |
| Antioxidant | 1 | 1 |
| Ultraviolet absorber | 1 | 1 |
| Weathering stabilizer | 1 | 1 |
| Catalyst | 2 | 2 |
| Viscosity of Compounded rubber (B type viscometer) | | |
| Viscosity (cPs) at 0.01 rpm | 8,000,000 | 13,500,000 |
| Properties of Cross-linked rubber | | |
| TB (MPa) | 0.55 | 0.45 |
| EB (%) | 550 | 190 |
| Dymanic fatigue resistance de Mattia flexing fatigue test Number of flexing until a crack was grown to 15 mm | Not less then $10^3$ | $10^2$ |

INDUSTRIAL APPLICABILITY

The silicon-containing olefin copolymer of the present invention can be used in a cross-linked state and has a high cross-linking rate, and excellent productivity, heat aging resistance, weathering resistance, and also can prepare molded articles having excellent properties such as scratch resistance, resistance to compressive set, electric properties and strength.

The cross-linkable rubber composition of the present invention comprises the above copolymer so that it can be cross-linked and submitted to use. Further it has a high cross-linking rate, and excellent productivity, heat aging resistance, weathering resistance, and also can prepare molded articles (cross-linked products) having excellent properties such as scratch resistance, resistance to compressive set, electric properties and strength.

Therefore, the cross-linkable rubber composition of the present invention can be suitably applied for uses such as electric and electronic parts, transporting machines, civil engineering and constructions, medical treatment or leisure activities. Further, the rubber composition of the present invention can be cured at room temperature or at a low temperature so that it is useful to uses, for example, sealing materials, potting materials, coating materials, and adhesives, and further is useful to covering compositions used for airplanes, constructions, automobiles and glass, sealing compositions, and surface-treating agents for various inorganic materials.

The cross-linked article of the present invention is obtainable by cross-linking the above rubber composition so that it has excellent heat ageing properties and weathering properties, and also excellent scratch resistance, resistance to compression set, electric properties, strength and other properties.

What is claimed is:

1. A silicon-containing olefin copolymer comprising:
   (a) a constituent unit derived from —$CH_2$—$CH_2$—,
   (b) a constituent unit derived from —$CH_2$—CHR— where R is a hydrocarbon group of 1 to 18 carbon atoms, and
   (c) a constituent unit represented by the following formula (I)

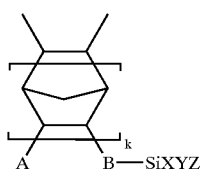

wherein k is 0, 1 or 2,
A is a hydrogen atom or a hydrocarbon group of 1 to 6 carbon atoms,
B is a single bond or a hydrocarbon group of 1 to 20 carbon atoms,
X, Y and Z are each independently selected from the group consisting of a hydrocarbon group of 1 to 6 carbon atoms, alkoxy group of 1 to 6 carbon atoms, acyloxy group, ketoximate group, amide group, acid amide group, aminoxy group, thioalkoxy group and amino group, at least one of X, Y and Z is selected from the group consisting of an alkoxy group of 1 to 6 carbon atoms, acyloxy group, ketoximate group, amide group, acid amide group, and aminoxy group;
and having:
   (i) a molar ratio (a)/(b) of the constituent unit (a) to the constituent unit (b) of from 99/1 to 30/70,
   (ii) a content of the constituent unit (c) of from 0.1 to 10 mol % based on 100 mol % of the total amounts of the constituent units (a), (b) and (c), and
   (iii) a branching index of not less than 0.70.

2. The silicon-containing olefin copolymer according to claim 1 wherein the constituent unit (c) is represented by the formula (I) in which k is 0, A is a hydrogen atom and B is represented by —$(CR^1R^2)_n$—, wherein the constituent unit (c) is represented by the following formula (II):

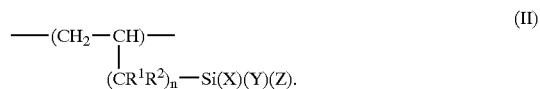

wherein n is an integer of 0 to 10,
$R^1$ and $R^2$ each are independently a hydrogen atom or an alkyl group of 1 to 3 carbon atoms, and when n is 2 or more, the plural groups $R^1$ may be identical or different each other and the plural groups $R^2$ may be also identical or different each other.

3. The silicon-containing olefin copolymer according to claim 1 wherein the constituent unit (c) is represented by the formula (I) in which k is 1, A is a hydrogen atom and B is represented by —$(CR^1R^2)_n$—, wherein the constituent unit (c) is represented by the following formula (III):

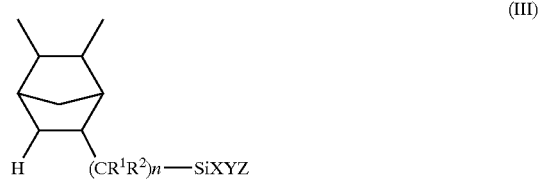

wherein n is an integer of 0 to 10,
$R^1$ and $R^2$ each are independently a hydrogen atom or an alkyl group of 1 to 3 carbon atoms, and when n is 2 or more, the plural groups $R^1$ may be identical or different each other and the plural groups $R^2$ may be also identical or different each other.

4. A silicon-containing olefin copolymer which is cross-linkable and obtainable by copolymerizing ethylene, an α-olefin of 3 to 20 carbon atoms and an ethylene monomer having a silicon-containing group represented by the following formula (IV):

wherein X, Y, and Z are each independently selected from the group consisting of a hydrocarbon group of 1 to 6 carbon atoms, alkoxy group of 1 to 6 carbon atoms, acyloxy group, ketoximate group, amide group, acid amide group, aminoxy group, thioalkoxy group and amino group, at least one of X, Y and Z is selected from the group consisting of an alkoxy group of 1 to 6 carbon atoms, acyloxy group, ketoximate group, amide group, acid amide group, and aminoxy group;
and which copolymer has:
   (i) a molar ratio of ethylene to α-olefin of 3 to 20 carbon atoms of from 99/1 to 30/70, (ii) a content of the ethylene monomer having a silicon-containing group of from 0.1 to 10 mol % based on 100 mol % of the total amounts of ethylene, α-olefin and the ethylene monomer having a silicon-containing group of the formula (IV), and (iii) a branching index of not less than 0.70.

5. The silicon-containing olefin copolymers according to claim 1 which has an intrinsic viscosity η, as measured in decalin at 135° C., of from 0.1 to 10 dl/g.

6. The silicon-containing olefin copolymers according to claim 1 which satisfies the following formula:

IV<33800/Mn wherein Mn is a number average molecular weight and IV is an iodine value.

7. A cross-linkable rubber composition comprising a silicon-containing olefin copolymer according to claim 1.

8. The rubber composition according to claim 7 used in electric and electronic parts, transporting machines, civil engineering and constructions, medical treatment or leisure activities.

9. The rubber composition according to claim 7 used for sealing materials, potting materials, coating materials and adhesives.

10. A sealing material, potting material, coating material or adhesive comprising a rubber composition according to claim 7.

11. A cross-linked product obtainable by cross-linking a rubber composition according to claim 7.

* * * * *